(12) United States Patent
Huang et al.

(10) Patent No.: US 10,963,705 B2
(45) Date of Patent: Mar. 30, 2021

(54) SYSTEM AND METHOD FOR POINT-TO-POINT TRAFFIC PREDICTION

(71) Applicant: Beijing DiDi Infinity Technology and Development Co., Ltd., Beijing (CN)

(72) Inventors: Tao Huang, San Jose, CA (US); Yintai Ma, Evanston, IL (US); Zhiwei Qin, San Jose, CA (US)

(73) Assignee: Beijing DIDI Infinity Technology and Development Co., Ltd., Beijing (CN)

( * ) Notice: Subject to any disclaimer, the term of this patent is extended or adjusted under 35 U.S.C. 154(b) by 113 days.

(21) Appl. No.: 16/234,945

(22) Filed: Dec. 28, 2018

(65) Prior Publication Data

US 2020/0042799 A1 Feb. 6, 2020

Related U.S. Application Data

(60) Provisional application No. 62/712,891, filed on Jul. 31, 2018.

(51) Int. Cl.
*G06K 9/00* (2006.01)
*G06K 9/62* (2006.01)
*G06N 3/08* (2006.01)

(52) U.S. Cl.
CPC ..... *G06K 9/00785* (2013.01); *G06K 9/00664* (2013.01); *G06K 9/6256* (2013.01); *G06K 9/6262* (2013.01); *G06N 3/08* (2013.01)

(58) Field of Classification Search
CPC ...... G08G 1/00; G06K 9/6271; G06K 9/6262; G06K 9/4628; G06K 9/00785;
(Continued)

(56) References Cited

U.S. PATENT DOCUMENTS 6,470,261 B1 * 10/2002 Ng .................. G06N 3/086
701/117
9,552,726 B2 * 1/2017 McGrath ............ G06K 9/00785
(Continued)

FOREIGN PATENT DOCUMENTS

CN 107154150 A 9/2017
JP 2011-113547 A 6/2011

OTHER PUBLICATIONS

Martin Abadi et al., "TensorFlow: A System for Large-Scale Machine Learning," in OSDI '16., 12th USENIX Symposium on Operating Systems Design and Implementation, 2016, pp. 265-283.
(Continued)

*Primary Examiner* — Gregory M Desire
(74) *Attorney, Agent, or Firm* — Sheppard Mullin Richter & Hampton LLP

(57) ABSTRACT

A method for point-to-point traffic prediction comprises: obtaining, from a plurality of computing devices, time-series locations of a plurality of vehicles respectively associated with the computing devices, wherein: the time-series locations form first trajectory data comprising corresponding trajectories at least passing from a first point O to a second point D within a first time interval; obtaining a traffic volume between O and D for a second time interval that is temporally after the first time interval; training one or more weights of a neural network model by inputting the first trajectory data and the traffic volume to the neural network model and using the obtained traffic volume as ground truth to obtain a trained neural network model; and inputting second trajectory data between O and D to the trained neural network model to predict a future traffic volume between O and D for the a future time interval.

20 Claims, 12 Drawing Sheets

(58) Field of Classification Search
CPC .. G06K 9/6256; G06K 9/0064; G06N 3/0454; G06N 3/08; G06N 3/088; G06N 3/0445
See application file for complete search history.

(56) References Cited

U.S. PATENT DOCUMENTS

| | | | | |
|---|---|---|---|---|
| 10,042,055 | B2* | 8/2018 | Zhao | G08G 1/096816 |
| 10,127,811 | B2* | 11/2018 | Xu | G08G 1/0129 |
| 10,540,891 | B2* | 1/2020 | Ashida | G08G 1/081 |
| 10,692,367 | B2* | 6/2020 | Nguyen | G08G 1/08 |
| 10,762,364 | B2* | 9/2020 | Stenneth | G06K 9/6262 |
| 2018/0181884 | A1* | 6/2018 | Rolle | G08G 1/096783 |
| 2019/0279082 | A1* | 9/2019 | Moloney | G06N 3/0454 |
| 2020/0042799 | A1* | 2/2020 | Huang | G06K 9/6271 |

OTHER PUBLICATIONS

Yali Amit et al., "Shape quantization and recognition with randomized trees," Neural Computation, vol. 9, (1997), pp. 1545-1588.

Constantinos Antoniou et al., "Incorporating automated vehicle identification data into origin-destination estimation," Transportation Research Record: Journal of the Transportation Research Board, No. 1882 (Jan. 2004), pp. 37-44.

Runa Ásmundsdottir, "Dynamic OD matrix estimation using floating car data. Master's thesis," Delft University of Technology, Mar. 2008.

M. Bierlaire et al., "An Efficient Algorithm for Real-Time Estimation and Prediction of Dynamic OD Tables," Operations Research, vol. 52, No. 1 (2004), pp. 116-127.

Leo Breiman, "Random Forests," Machine learning, vol. 45, No. 1 (2001), pp. 5-32.

Francesco Calabrese et al., "Estimating Origin-Destination Flows Using Opportunistically Collected Mobile Phone Location Data From One Million Users in Boston Metropolitan Area," IEEE Pervasive Computing, vol. 10, No. 4 (2011), pp. 36-44.

Peng Cao et al., "Bilevel Generalized Least Squares Estimation of Dynamic Origin-Destination Matrix for Urban Network with Probe Vehicle Data," Transportation Research Record: Journal of the Transportation Research Board, No. 2333 (2013), pp. 66-73.

Anthony Chen et al., "Norm approximation method for handling traffic count inconsistencies in path flow estimator," Transportation Research Part B: Methodological, vol. 43, No. 8 (2009), pp. 852-872.

Bokui Chen et al., "A comprehensive study of advanced information feedbacks in real-time intelligent traffic systems," Physica A: Statistical Mechanics and its Applications, vol. 391, No. 8 (2012), pp. 2730-2739.

Chenyi Chen et al, "Short-time traffic flow prediction with ARIMA-GARCH model", IEEE Intelligent Vehicles Symposium (IV), Jun. 5-9, 2011 IEEE, Baden-Baden, Germany, pp. 607-612.

François Chollet et al., "Keras: The Python Deep Learning Library," .https://keras.io. 2015.

Pedro Domingos, "The master algorithm: How the quest for the ultimate learning machine will remake our world," Basic Books. 2015.

James Durbin et al., "Time series analysis by state space methods," vol. 38. Oxford University Press. 2012.

Felix A. Gers et al., "Learning to Forget: Continual Prediction with LSTM," Neural Comput., vol. 12, No. 10 (Oct. 2000), pp. 2451-2471. https://doi.org/10.1162/089976600300015015.

Alex Graves et al., "Speech Recognition with Deep Recurrent Neural Networks," ICASSP, IEEE International Conference on Acoustics, Speech and Signal Processing—Proceedings, No. 38 (Mar. 2013), pp. 6645-6649.

Jianhua Guo et al., "Adaptive Kalman filter approach for stochastic short-term traffic flow rate prediction and uncertainty quantification," Transportation Research Part C: Emerging Technologies vol. 43 (2014), pp. 50-64.

Kaiming He et al., "Deep Residual Learning for Image Recognition," in CVPR. IEEE Computer Society, 2016, pp. 770-778.

Sepp Hochreiter et al., "Long Short-Term Memory," Neural Comput., vol. 9, No. 8 (Nov. 1997), pp. 1735-1780.

Md. Shahadat IQBAL et al., "Development of origin-destination matrices using mobile phone call data: A simulation based approach," Transportation Research Part C: Emerging Technologies, vol. 40 (2014), pp. 63-74.

Diederik P. Kingma et al., "Auto-encoding Variational Bayes," arXiv preprint arXiv:1312.6114v10, May 1, 2014, 14 pages.

Yaguang Li et al., "Diffusion Convolutional Recurrent Neural Network: Data-Driven Traffic Forecasting," in International Conference on Learning Representations. Feb. 22, 2018.

Cheng-Yuan Liou et al., "Modeling word perception using the Elman network," Neurocomputing, vol. 71, No. 16-18, 2008, pp. 3150-3157.

Tianqi chen et al., "Xgboost: A scalable tree boosting system," in Proceedings of the 22nd acm sigkdd international conference on knowledge discovery and data mining. ACM, 2016, pp. 785-794.

Zhenbo Lu et al., "A Kalman filter approach to dynamic OD flow estimation for urban road networks using multi-sensor data," Journal of Advanced Transportation, vol. 49, No. 2 (2015), pp. 210-227.

Lei LV et al., "A plane moving average algorithm for short-term traffic flow prediction," in Advances in Knowledge Discovery and Data Mining. Springer, 2015, pp. 357-369.

Lorenzo Mussone et al., "A Neural Network Approach to Motorway OD Matrix Estimation from Loop Counts," Journal of Transportation Systems Engineering and Information Technology, vol. 10, No. 1 (Feb. 2010), pp. 88-98.

Mark EJ Newman, "Detecting community structure in networks," The European Physical Journal B, vol. 38, No. 2 (2004), pp. 321-330.

Luis Ramon Leon Ojeda et al., "Adaptive Kalman filtering for multi-step ahead traffic flow prediction," in 2013 American Control Conference (ACC 2013), 2013.

Mike Schuster et al., "Bidirectional recurrent neural networks," IEEE Transactions on Signal Processing vol. 45, No. 11 (1997), pp. 2673-2681.

Brian L. Smith et al., "Comparison of parametric and nonparametric models for traffic flow forecasting," Transportation Research Part C: Emerging Technologies, vol. 10, No. 4 (2002), pp. 303-321.

Ilya Sutskever et al., "Sequence to Sequence Learning with Neural Networks," in Proceedings of the 27th International Conference on Neural Information Processing Systems—vol. 2 (NIPS'14). MIT Press, Cambridge, MA, USA, pp. 3104-3112.

Yaniv Taigman et al., "DeepFace: Closing the Gap to Human-Level Performance in Face Verification," in 2014 IEEE Conference on Computer Vision and Pattern Recognition. pp. 1701-1708.

Dong-wei Xu et al., "Real-time road traffic state prediction based on ARIMA and Kalman filter," Frontiers of Information Technology & Electronic Engineering, vol. 18, No. 2 (2017), pp. 287-302.

Hai Yang et al., "Heuristic algorithms for the bilevel origin-destination matrix estimation problem," Transportation Research Part B: Methodological, vol. 29, No. 4 (Aug. 1995), pp. 231-242. Abstract Only.

Xianfeng Yang et al., "Origin-Destination Estimation Using Probe Vehicle Trajectory and Link Counts," Journal of Advanced Transportation, vol. 2017, Article 4341532, 18 pages.

Liyan Zhang et al., "Examples of Validating an Adaptive Kalman Filter Model for Short-Term Traffic Flow Prediction," in CICTP 2012: Multimodal Transportation Systems—Convenient, Safe, Cost-Effective, Efficient. 2012, pp. 912-922.

Hui Zhao et al., "Estimation of Time-Varying OD Demands Incorporating FCD and RTMS Data," Journal of Transportation Systems Engineering and Information Technology, vol. 10, No. 1 (2010), pp. 72-80.

Xuesong Zhou et al., "Dynamic origin-destination demand estimation using automatic vehicle identification data," IEEE Transactions on Intelligent Transportation Systems, vol. 7, No. 1 (2006), pp. 105-114.

Henk J. Van Zuylen et al., "The most likely trip matrix estimated from traffic counts," Transportation Research Part B: Methodological, vol. 14B, No. 3 (Feb. 1980), pp. 281-293.

(56) References Cited

OTHER PUBLICATIONS

Huaxiu Yao et al., "Modeling spatial-temporal dynamics for traffic prediction," arXiv preprint arXiv:1803.01254, 2018.
Jianying Liu et al., "A hybrid model based on kalman filter and neutral network for traffic prediction," in 2012 IEEE 2nd International Conference on Cloud Computing and Intelligence Systems, vol. 2. IEEE, 2012, pp. 533-536.
Yisheng LV et al., "Traffic flow prediction with big data: a deep learning approach," IEEE Transactions on Intelligent Transportation Systems, vol. 16, No. 2, pp. 865-873, 2015.
Junbo Zhang et al., "Deep spatio-temporal residual networks for citywide crowd flows prediction," in 31st AAAI Conference on Artificial Intelligence, 2017.
Xingyi Cheng et al., "DeepTtransport: Learning spatial-temporal dependency for traffic condition forecasting," in 2018 International Joint Conference on Neural Networks (IJCNN). IEEE, 2018, pp. 1-8.
Dongjie Wang et al., "DeepSTCL: A deep spatio-temporal ConvLSTM for travel demand prediction," in 2018 International Joint Conference on Neural Networks (IJCNN). IEEE, 2018, pp. 1-8.
Thomas N. Kipf et al., "Semi-supervised classification with graph convolutional networks," arXiv preprint arXiv:1609.02907, 2016.
Xi Xiong et al., "Dynamic Origin-Destination Matrix Prediction with Line Graph Neural Networks and Kalman Filter," arXiv preprint arXiv:1905.00406, 2019.
Yosef Sheffi, Urban Transportation Networks: Equilibrium Analysis with Mathematical Programming Methods, Prentice-Hall, Englewood Cliffs, NJ, 1985.
Xiaojin Zhu et al., "Learning from labeled and unlabeled data with label propagation," School of Computer Science, Carnegie Mellon University, Tech. Rep., Jun. 2002.
PCT International Search Report dated Apr. 28, 2019, issued in related International Application No. PCT/US2018/067823 (10 pages).
Cui Z. et al., Deep Stacked Bidirectional and Unidirectional LSTM Recurrent Neural Network for Network-wide Traffic Speed Prediction. arXiv preprint arXiv:1801.02143, Jan. 7, 2018 [Retrieved on Apr. 2, 2019].
Kong F. et al., Construction of Intelligent Traffic Information Recommendation System Based on Long Short-Term Memory. 10.1016/j.jocs.2018.03.010, Mar. 22, 2018, vol. 26, pp. 78-86 [Retrieved on Apr. 2, 2019].
Duan Z. et al., Improved Deep Hybrid Networks for Urban Traffic Flow Prediction Using Trajectory Data. IEEE Access, Jun. 29, 2018, vol. 6, pp. 31820-31827 [Retrieved on Apr. 2, 2019].
Yu H. et al., Spatiotemporal Recurrent Convolutional Networks for Traffic Prediction in Transportation Networks. Sensors, Jun. 26, 2017, vol. 17, pp. 1501:1-16 [Retrieved on Apr. 2, 2019].
Azzouni A. & Pujolle G., Long Short-Term Memory Recurrent Neural Network Framework for Network Traffic Matrix Prediction. arXiv preprint arXiv:1705.05690, Jun. 8, 2017 [Retrieved on Apr. 2, 2019].
Fu Z. et al., Using LSTM and GRU Neural Network Methods for Traffic Flow Prediction. 31st Youth Academic Annual Conference of Chinese Association of Automation (YAC), Nov. 13, 2016, pp. 324-328 [Retrieved on Apr. 2, 2019].
Zhao Z. et al., LSTM Network: A Deep Learning Approach for Short-Term Traffic Forecast. /ET Intelligent Transporl Systems, Feb. 24, 2017, vol. 11, No. 2, pp. 68-75 [Retrieved on Apr. 2, 2019].

\* cited by examiner

410

411: obtaining, by a processor and from a plurality of computing devices, time-series locations of a plurality of vehicles respectively associated with the computing devices. The time-series locations form at least (1) trajectory data i comprising corresponding trajectories at least passing through a first point pair within a first time interval and (2) trajectory data j comprising corresponding trajectories at least passing through a second point pair within the first time interval. The first point pair and the second point pair each comprise a point O and a point D, traffic flowing from the point O to the point D. The first point pair and the second point pair have at least one of: different O points or different D points.

412: obtaining, by a detector, a traffic volume between the first point pair for a second time interval that is temporally after the first time interval

413: training, by the processor, one or more weights of a neural network model by inputting the trajectory data i, the trajectory data j, and the traffic volume to the neural network model to obtain a trained neural network model, wherein the neural network model comprises a correlation between the trajectory data i and the trajectory data j

414: inputting, by the processor, trajectory data k between the second point pair to the trained neural network model to predict a future traffic volume through the second point pair for the a future time interval

FIG. 4B

SYSTEM AND METHOD FOR POINT-TO-POINT TRAFFIC PREDICTION

CROSS REFERENCE TO RELATED APPLICATIONS

The present application is based on and claims priority to the U.S. Provisional Application No. 62/712,891, filed on Jul. 31, 2018 and entitled "SYSTEM AND METHOD FOR POINT-TO-POINT TRAFFIC PREDICTION". The contents of the above application are incorporated herein by reference in their entirety.

TECHNICAL FIELD

This disclosure generally relates to methods and devices for point-to-point traffic prediction.

BACKGROUND

Point-to-point traffic flow data is an important instrument for traffic pattern understanding, traffic flow management, and transportation infrastructure decision making. So far, traditional methods for studying traffic pattern such as through survey or the installation of detectors at certain locations are costly and are limited by the availability of detectors.

SUMMARY

Various embodiments of the present disclosure include systems, methods, and non-transitory computer readable media for point-to-point traffic prediction.

According to one aspect, a method for point-to-point traffic prediction comprises: obtaining, by a processor and from a plurality of computing devices, time-series locations of a plurality of vehicles respectively associated with the computing devices, wherein: the time-series locations form first trajectory data comprising corresponding trajectories at least passing from a first point O to a second point D within a first time interval; obtaining, by a detector, a traffic volume between O and D for a second time interval that is temporally after the first time interval; training, by the processor, one or more weights of a neural network model by inputting the first trajectory data and the traffic volume to the neural network model and using the obtained traffic volume as ground truth to obtain a trained neural network model; and inputting, by the processor, second trajectory data between O and D to the trained neural network model to predict a future traffic volume between O and D for the a future time interval.

In some embodiments, the traffic volume comprises a number of vehicles that travel from O to D for the second time interval. Obtaining the traffic volume comprises: capturing first images of vehicle plates of a first number of all vehicles passing through O within the second time interval, and capturing second images of vehicle plates of a second number of all vehicles passing through D within the second time interval t; and determining a number of vehicles with vehicle plates detected from the first images and subsequently from the second images as the number of vehicles.

In some embodiments, the method further comprises: in response to determining the predicted future traffic volume to exceed a threshold, sending a signal, by the processor, to a traffic signal controller to allow more traffic to pass through during the future time interval.

In some embodiments, the neural network model comprises: an input layer, a first BiLSTM (bidirectional long short-term memory) layer, a first BN (batch normalization) layer, a second BiLSTM layer, a second BN layer, a first dense layer, a third BN layer, a second dense layer, and an output layer connected in series.

According to another aspect, a method for point-to-point traffic prediction comprises: obtaining, by a processor and from a plurality of computing devices, time-series locations of a plurality of vehicles respectively associated with the computing devices. The time-series locations form at least (1) trajectory data i comprising corresponding trajectories at least passing through a first point pair within a first time interval and (2) trajectory data j comprising corresponding trajectories at least passing through a second point pair within the first time interval. The first point pair and the second point pair each comprise a point O and a point D, traffic flowing from the point O to the point D. The first point pair and the second point pair have at least one of: different O points or different D points. The method for point-to-point traffic prediction further comprises: obtaining, by a detector, a traffic volume between the first point pair for a second time interval that is temporally after the first time interval; training, by the processor, one or more weights of a neural network model by inputting the trajectory data i, the trajectory data j, and the traffic volume to the neural network model to obtain a trained neural network model, wherein the neural network model comprises a correlation between the trajectory data i and the trajectory data j; and inputting, by the processor, trajectory data k between the second point pair to the trained neural network model to predict a future traffic volume through the second point pair for the a future time interval.

In some embodiments, the traffic volume comprises a number of vehicles that travel through the first point pair for the second time interval. Obtaining the traffic volume comprises: capturing first images of vehicle plates of a first number of all vehicles passing through the O point of the first point pair within the second time interval, and capturing second images of vehicle plates of a second number of all vehicles passing through the D point of the first point pair within the second time interval; and determining a number of vehicles with vehicle plates detected from the first images and subsequently from the second images as the number of vehicles.

In some embodiments, the method further comprises: in response to determining the predicted future traffic volume to exceed a threshold, sending a signal, by the processor, to a traffic signal controller to allow more traffic to pass through during the future time interval.

In some embodiments, the neural network model comprises: an input layer, a first LSTM (long short-term memory) layer, a first BN (batch normalization) layer, a second LSTM layer, a second BN layer, a dense layer, and an output layer connected in series.

In some embodiments, the first BN layer is further outputted to a third LSTM layer; the third LSTM layer is outputted to a third BN layer; and the third BN layer is outputted to another output layer for obtaining projected trajectory data.

In some embodiments, training the one or more weights of the neural network model comprises minimizing a total loss; the total loss comprises a first loss parameter associated with a difference between the trajectory data i and the projected trajectory data. The total loss comprises a second loss parameter associated with the correlation. The second loss parameter is further associated with a difference between a predicted traffic volume for the first point pair and a predicted traffic volume for the second point pair; and the predicted traffic volume for the second point pair is adjusted by a ratio trained by a random forest model. The total loss comprises a third loss parameter associated with a difference between a predicted traffic volume and the obtained traffic volume; and the predicted traffic volume is predicted based on the trajectory data i.

According to another aspect, a system for point-to-point traffic prediction comprises: a detector configured to obtain a traffic volume between a first point pair for a second time interval that is temporally after a first time interval; and a processor configured to: obtain the traffic volume from the detector, and obtain, from a plurality of computing devices, time-series locations of a plurality of vehicles respectively associated with the computing devices. The time-series locations form at least (1) trajectory data i comprising corresponding trajectories at least passing through the first point pair within the first time interval and (2) trajectory data j comprising corresponding trajectories at least passing through a second point pair within the first time interval. The first point pair and the second point pair each comprise a point O and a point D, traffic flowing from the point O to the point D. The first point pair and the second point pair have at least one of: different O points or different D points. The processor is further configured to: train one or more weights of a neural network model by inputting the trajectory data i, the trajectory data j, and the traffic volume to the neural network model to obtain a trained neural network model, wherein the neural network model comprises a correlation between the trajectory data i and the trajectory data j; and input trajectory data k between the second point pair to the trained neural network model to predict a future traffic volume through the second point pair for the a future time interval.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 4B illustrates a flowchart of another exemplary method for point-to-point traffic prediction, in accordance with various embodiments.

DETAILED DESCRIPTION

Figure 1:
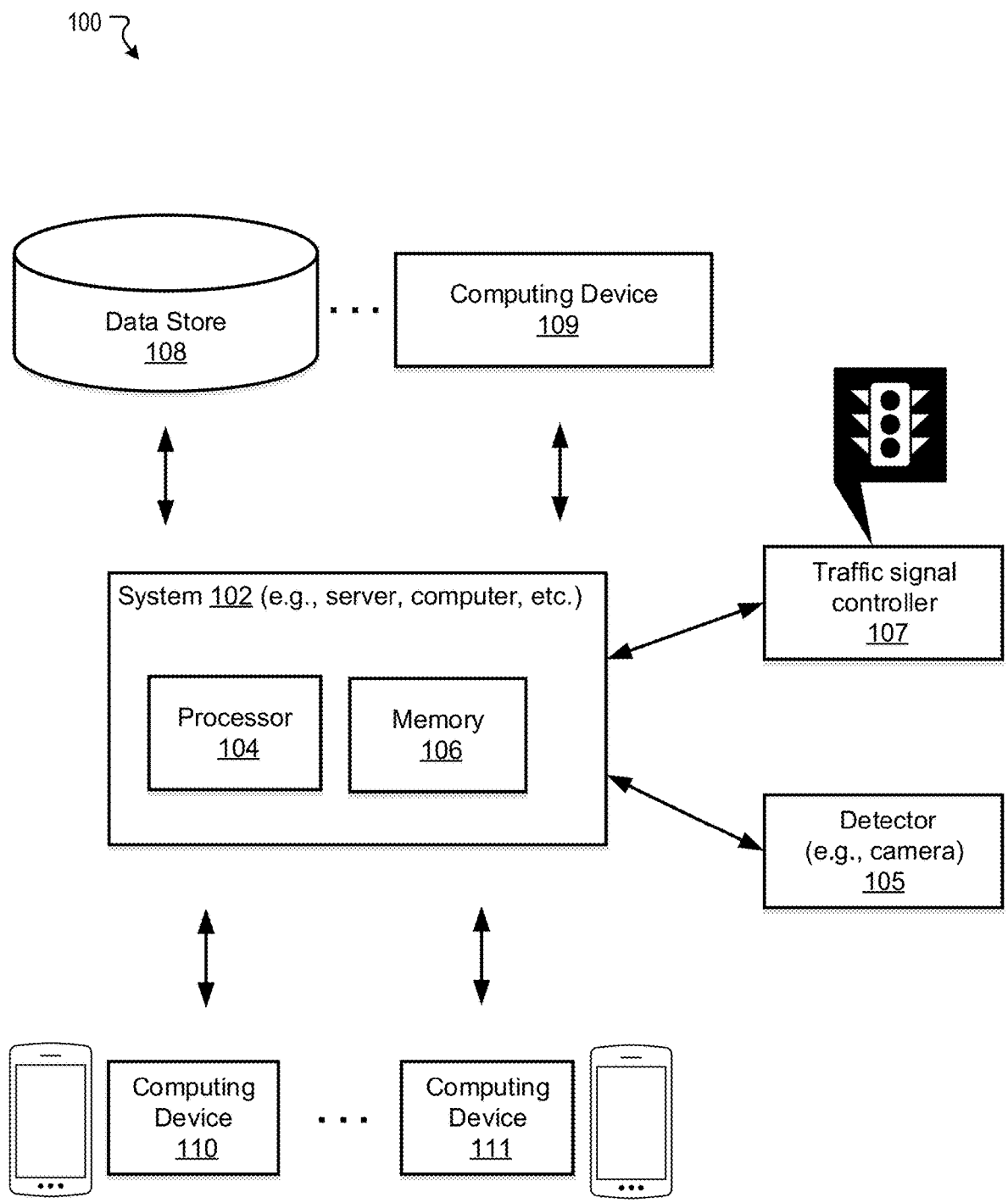
FIG. 1 illustrates an exemplary system for point-to-point traffic prediction, in accordance with various embodiments.

Point-to-point flow data refer to information of traffic (e.g., the number of vehicles) flowing from one point to another within a certain period of time. The point-to-point flow data is an important instrument for traffic pattern understanding, traffic flow management, and transportation infrastructure decision making. For example, the number of vehicles passing between a point pair can be used to estimate a number of people travelling between the points. In this disclosure, point-to-point traffic may comprise origin-destination (O-D or OD) traffic, that is, traffic passing through an origin point at an earlier time and through a destination point at a later time. In this disclosure, the "origin" and "destination" may refer to a first and a second location points within a vehicle's travel trajectory, instead of the actual origin and destination of the vehicle's travel trajectory. As long as the vehicle passes through the "origin" point and subsequently through the "destination" point, the vehicle's travel path between the "origin" and "destination" point pair may be counted towards the disclosed point-to-point traffic prediction.

So far, traditional methods for studying traffic pattern such as through survey or the installation of detectors at the point locations are costly and are limited by the availability of detectors, despite the efforts made on statistical and stochastic models for OD flow estimation and prediction based on limited link volume data or automatic vehicle identification (AVI) data. With the emergence of smart phone usage and ride sharing economy, large amounts of trajectory data of travelers are produced every day, which can be used to leverage the OD flow estimation and prediction on a complex OD network in a relatively large spatial scale. In this disclosure, various deep learning-based models and a Kalman Filter model are provided for traffic pattern understanding, traffic flow management, transportation infrastructure decision making, and various other applications. The disclosed models can make prediction of OD flows of an urban network solely based on trajectory data. The proposed semi-supervised learning model is able to offer predictions for OD flows with limited spatial coverage of ground truth data. That is, the disclosed methods can provide reliable point-to-point traffic prediction even with insufficient ground truth data, which traditional prediction methods are unable to work with. Fused with AVI data, this model can provide OD estimation and prediction on a large spatial area, in which case traditional AVI based models may not work well due to very limited accessibility of AVI.

OD data is critically important for numerous transportation applications, including understanding the travel patterns of users, and planning for the future infrastructure development. Conventional methods for OD data collection rely on costly home interviews or surveys, e.g., national household travel surveys in the U.S. Nowadays, such OD flow data can be measured with AVI data collected with camera detectors. However, due to the high cost of installation of the detectors, the availability of the measured OD data is very limited. To overcome the deficiencies of current technologies, the disclosed systems and methods improve the traffic prediction process with the addition of vehicle trajectory data. For example, the disclosed systems and methods may predict OD data between a target point pair by fusing vehicle trajectory data of real drivers with AVI data of one or more other point pairs. As a result, OD can be inferred without direct measurement of the target point pair.

In current technologies, data fusion of AVI and probe vehicle has not been tapped. For traffic prediction, fusing these two sources of data have multiple unique advantages: (1) AVI data can provide valid measurement of OD data; and (2) probe vehicle data can provide a wide spatial coverage, so that OD data can be inferred with a large scale. The predicted OD flow data can be used to gain insights for travel patterns of road users, to assist in improving traffic condition prediction, and ultimately to be utilized in real-time traffic signal control in a large-scale transportation network. In addition, the disclosed systems and methods fill the void in existing technologies with respect to OD flow prediction in a semi-supervised setting, by leveraging the supervised OD data to predict the unsupervised OD pairs.

FIG. 1 illustrates an exemplary system 100 for point-to-point traffic prediction, in accordance with various embodiments. As shown in FIG. 1, the exemplary system 100 may comprise at least one computing system 102 that includes one or more processors 104 and a memory 106. The memory 106 may be non-transitory and computer-readable. The memory 106 may store instructions that, when executed by the one or more processors 104, cause the one or more processors 104 to perform various operations described herein. The system 102 may be implemented on or as devices such as mobile phone, tablet, server, computer, wearable device, etc. The system 102 above may be installed with a software (e.g., platform program) and/or hardware (e.g., wires, wireless connections) to access other devices of the system 100.

The system 100 may include one or more data stores (e.g., a data store 108) and one or more computing devices (e.g., a computing device 109) that are accessible to the system 102. The data store 108 and the computing devices may be optional and may assist the system 102 in performing various operations described herein.

The system 100 may further include one or more computing devices (e.g., computing devices 110 and 111) coupled to the system 102. The computing devices 110 and 111 may comprise cellphone, tablet, computer, wearable device, etc. The computing devices 110 and 111 may transmit data to or receive data from the system 102. For example, the computing devices 110 and 111 may transmit their locations to the system 102 for each time interval (e.g., five seconds), forming trajectory data represented by time-series location data. The system 102 may be configured to obtain data (e.g., the time-series location data) from any of the computing devices and data stores (e.g., the data store 108, the computing devices 109, 110, 111). The location may comprise GPS (Global Positioning System) coordinates of the corresponding terminal device, and if the user (e.g., driver or passenger) of the terminal device is in a vehicle, the terminal device location can represent the location of the vehicle. That is, the trajectory data can represent the movement of real vehicles with respect to time.

In some embodiments, the system 102 may implement an online information or service platform. The service may be associated with vehicles (e.g., cars, bikes, boats, airplanes, etc.), and the platform may be referred to as a vehicle platform, a service hailing platform, or a ride order dispatching platform. The platform may accept requests for transportation, identify vehicles to fulfill the requests, arrange for pick-ups, and process transactions. For example, a user may use the computing device 110 (e.g., a mobile phone installed with a software application associated with the platform) to request transportation from the platform. The system 102 may receive the request and relay it to various vehicle drivers (e.g., by posting the request to mobile phones carried by the drivers). A vehicle driver may use the computing device 111 (e.g., another mobile phone installed with the application associated with the platform) to accept the posted transportation request and obtain pick-up location information. Fees (e.g., transportation fees) can be transacted among the system 102 and the computing devices 110 and 111. Some platform data may be stored in the memory 106 or retrievable from the data store 108 and/or the computing devices 109, 110, and 111.

In some embodiments, the system 102 further comprises one or more detectors 105. The detectors 105 may couple to the system 102 through various way, e.g., through a network, through a wire connection, through a wireless connection, etc. The detectors 105 may be any detector that can detector traffic flow information. In one example, the detectors 105 comprise cameras installed next to a pathway (e.g., a highway, a street, a dirt road, etc.) and configured to capture images of vehicle plates on passing vehicles. The system 102 and/or another processor (e.g., a processor directly installed in the detector) may be configured to perform image recognition to detect the plate number from the captured images or an alternative unique identification of the vehicle, as long as the system 102 obtains information of the passing vehicles detected by the detectors. The information of the passing vehicles can be alternatively referred to as AVI data or traffic volume data as described below. In another example, the passing vehicles may send information such as the unique identification of the vehicles to the detectors 105 when passing by.

In some embodiments, the system 102 further comprises one or more signal controllers 107 coupled to the system 102. The signal controllers may be configured to control signal lights (e.g., red-green lights at crossroads, stop light, etc.).

In some embodiments, the system 102 and the one or more of the computing devices (e.g., the computing device 109) may be integrated in a single device or system. Alternatively, the system 102 and the one or more computing devices may operate as separate devices. The data store(s) may be anywhere accessible to the system 102, for example, in the memory 106, in the computing device 109, in another device (e.g., network storage device) coupled to the system 102, or another storage location (e.g., cloud-based storage system, network file system, etc.), etc. Although the system 102 and the computing device 109 are shown as single components in this figure, it is appreciated that the system 102 and the computing device 109 can be implemented as single devices or multiple devices coupled together. The system 102 may be implemented as a single system or multiple systems coupled to each other. The system 102, the computing device 109, the data store 108, the computing devices 110 and 111, the detector 105, and the traffic light controller 107 may be able to communicate with one another through one or more wired or wireless networks (e.g., the Internet) through which data can be communicated. Various aspects of the system 100 are described below in reference to FIG. 2 to FIG. 5.

Figure 2:
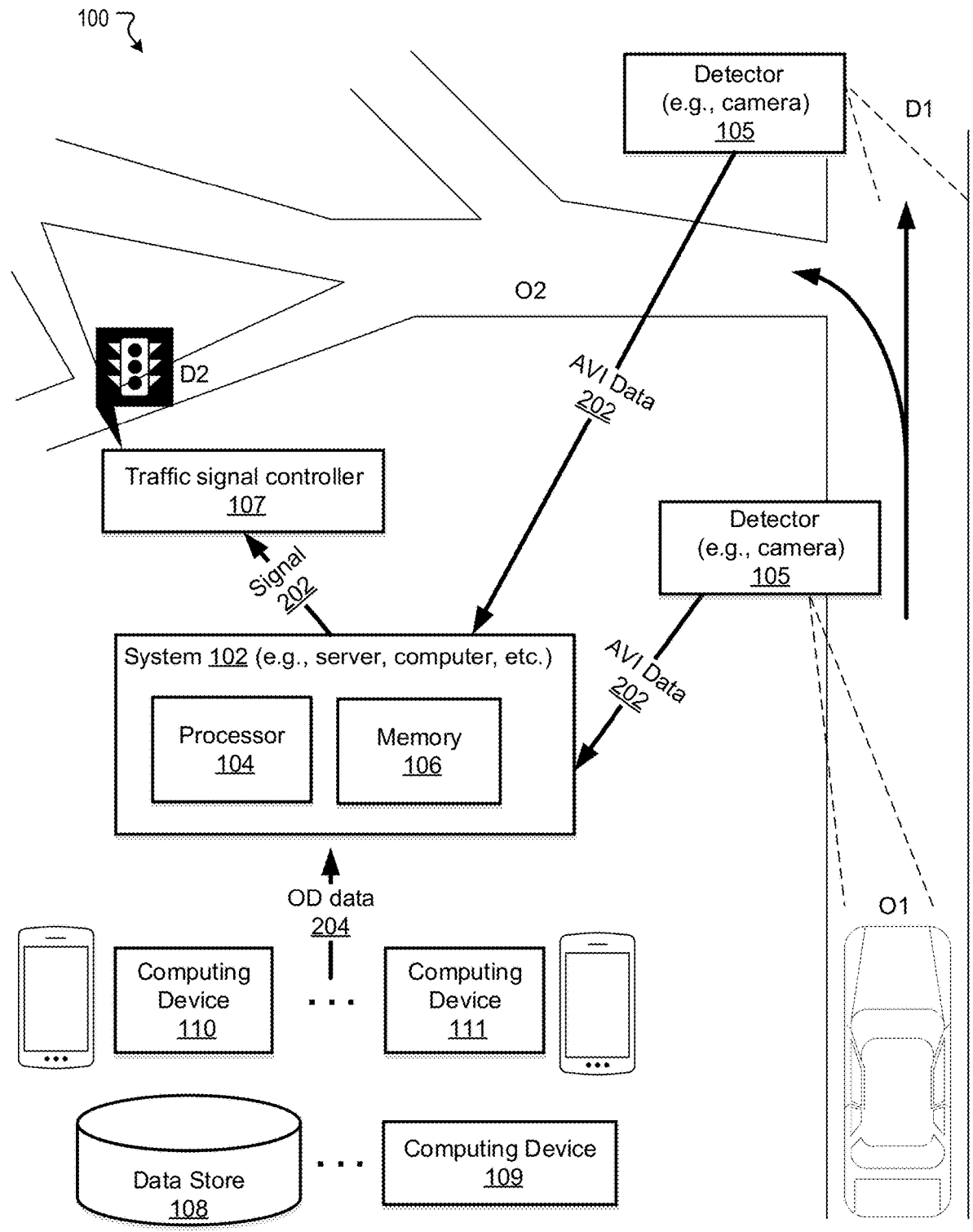
FIG. 2 illustrates an exemplary system for point-to-point traffic prediction, in accordance with various embodiments.

FIG. 2 illustrates an exemplary system 200 for point-to-point traffic prediction, in accordance with various embodiments. The operations shown in FIG. 2 and presented below are intended to be illustrative. In various embodiments, the detectors 105 may capture AVI data 202 and transmit the AVI data 202 to the system 102. The AVI data 202 may comprise the captured images based on which a number of vehicles passing the detection range of the detectors 105 may be determined. Alternatively, the AVI data 202 may comprise the number of vehicles passing the detection range of the detectors 105. In addition to the AVI data 202, the system 102 may obtain OD data 204 (e.g., trajectory data represented by time-series location data) from the data store 108 and/or the computing devices 109, 110, and/or 111. The obtained data 202 and 204 may be stored in the memory 106. The system 102 may train an algorithm (e.g., a recurrent neural network model) with the obtained data 202 and 204.

For illustration of this figure, in each OD pair (e.g., O1D1, O2D2), the traffic flows from the O point to the D point. In one example, locations O1 and D1 are respectively installed with the detectors 105 for capturing AVI data (first traffic volume data) for O1D1. In addition, the system 102 also obtains first trajectory data that passes through O1 and then D1. The system 102 may train the algorithm by supervised learning based on the first trajectory data and the first traffic volume data. For example, the first trajectory data may be at an earlier time and the first traffic volume data may be at a later time. For training, the algorithm may use the first traffic volume data as a ground truth to update weights of a model that predicts a later-time traffic volume based on an earlier-time trajectory data input. The trained algorithm can be used to predict a future traffic volume from O1 to D1 based on second trajectory data (e.g., more recent trajectory data between O1 and D1 than the first trajectory data) as input. The system 102 may control a traffic signal (not shown) based on the prediction. For example, the system 102 may control a traffic light at D1 to stay in green longer for a future time period, if a larger traffic flow is predicted for the future time period.

In another example, locations O1 and D1 are respectively installed with the detectors 105 capturing the first traffic volume data, while locations O2 and D2 are not installed with any detectors, and therefore the historical AVI data (historical traffic volume data) between O2 and D2 is unknown. The system 102 may train the algorithm by semi-supervised learning based on the first trajectory data and the first traffic volume data, which are historical data with respect to the point pair O1D1. Depending on the training results, the unknown historical traffic volume for a target point pair (e.g., traffic volume between point pair O1D2, traffic volume between point pair O2D2) may be determined depending on a correlation of the target point pair with the point pair O1D1. Similar to the point pair O1D1, the system 102 may train the algorithm by semi-supervised learning based on known historical data (trajectory data and traffic volume data) of a plurality of point pairs. The unknown historical traffic volume for the target point pair (e.g., traffic volume between point pair O1D2, traffic volume between point pair O2D2) may be determined depending on a correlation of the target point pair with the plurality of point pairs. The determined traffic volume for the target point pair can represent the unknown historical traffic volume (also referred to as unknown AVI data), which enables the future traffic flow prediction between the target point pair without having to install detectors at the target point pair. Thus, if the traffic volume between O1 and D2 is determined, the trained algorithm can be used to predict a future traffic volume from O1 to D2 based on second trajectory data (e.g., more recent trajectory data from O1 to D2). If the traffic volume between O2 and D2 is determined, the trained algorithm can be used to predict a future traffic volume from O2 to D2 based on second trajectory data (e.g., more recent trajectory data from O2 to D2). The system 102 may control a traffic signal through a traffic signal controller 107 based on the prediction. For example, the system 102 may control a traffic light at D2 to stay in green longer for a future time period, if a larger traffic flow is predicted for the future time period.

The prior example shows a method to overcome the limited availability of AVI data sources due to a lack of sufficient traffic nodes installed with devices such as high-resolution camera detectors (also referred to as bayonets). The probed vehicle data such as anonymous vehicle trajectory data may be fused with the AVI data to estimate and predict future OD flow. The anonymous vehicle trajectory data may be collected through various ways, such as a vehicle platform Application (APP) or an alternative program installed on smart phones of drivers. For example, when using the APP, the driver's smart phone may report the location of the smart phone to a server for each time interval (e.g., five seconds). As long as the driver is in the car, the smart phone location can track the vehicle location, and the time-location series can be used as the trajectory data. Likewise, a passenger's smart phone can achieve a similar function as long as the passenger is in the vehicle. In general, the estimation and prediction of the OD flow between two concerned traffic nodes may rely on indirect data, like the trajectory data generated by the smart phone program.

However, one concern for the above method is that the trajectory data making up for the lack of AVI data may only cover the APP users, which accounts for a small portion of daily travelers for all ODs. To address this concern, actual ride-sharing events may be collected through the vehicle platform APP. Trajectories are generated by actual willingness of travel from point A to point B at the moment when transaction happens. It can be seen as a sub-sampling over the population of all travels between ODs at a specific time. This may be similar to the mentioned conventional survey method, but more accurate, as each travel actually happened in real time, not to mention many APP users are routine users. Therefore, though the trajectories only cover a small portion of travels of OD data, they can be used to predict the overall OD data, or at least capture the temporal dynamics of the OD flows. Thus, by learning neural network model learned from bayonets, the semi-supervised can predict for ODs that are not even covered by bayonets.

Another concern is that all ODs concerned intertwine together, interact with each other, and develop in a very complex way. To at least mitigate that concern, a multi-layered Long Short-Term Memory (LSTM) neural network may be leveraged to capture the highly nonlinear evolution patterns among OD data, and map the input sequence of trajectory data conveyed OD flows to a vector that represents the prediction of the actual OD flows that will happen in the next time interval. Another concern is that over a certain spatial scale, all ODs intertwine together, interact with each other, and develop in a very complex way with mutual influence.

In some embodiments, a baseline model can be constructed for comparison with the disclosed supervised RNN model. Kalman filter has been widely applied in stationary and non-stationary data analysis for its favorable performance and computational efficiency. It requires only an extremely small storage capacity and is suitable for real-time traffic volume prediction. The Kalman filter can dynamically modify the prediction weight and has a high prediction accuracy. However, since road traffic time series is influenced by many factors and cannot be quantitatively analyzed, the estimation and measurement equations may be difficult to obtain. The baseline model may be constructed with Kalman Filter with the following prediction equations:

$$x_{.,t} = A_t x_{.,t-1} + P_{t-1}$$

$$y_{.,t} = R_t x_{.,t} + v_{t-1}$$

$A_t$ is a sparse matrix that its only nonzero parts are the diagonal square on its first (n, n) entries for time interval t. The dot in the subscript is a placeholder. $\{p\}$ and $\{v\}$ are white noises that p~N (0, Q) and v~N (0, Z). $R_t$ has a physical meaning of the penetration rate of APP vehicles (vehicles driven by the APP drivers) which is the percentage of X (trajectory data) in Y (AVI data), and its diagonal vector $r_t$ is modeled by ARIMA(1,1,1) model. The autoregressive moving average (ARMA) model is a widely used regression analysis methods. It determines the type of regression relationship between historical data and future data. Further, the autoregressive integrated moving average (ARIMA) model has been extensively applied to road traffic prediction. For each OD pair i, a separate ARIMA(1,1,1) model is trained to learn the temporal patterns of penetration ratio on this pair:

$$r_{t_i} = ARIMA(r_{t-1_i})$$

Figure 3A:
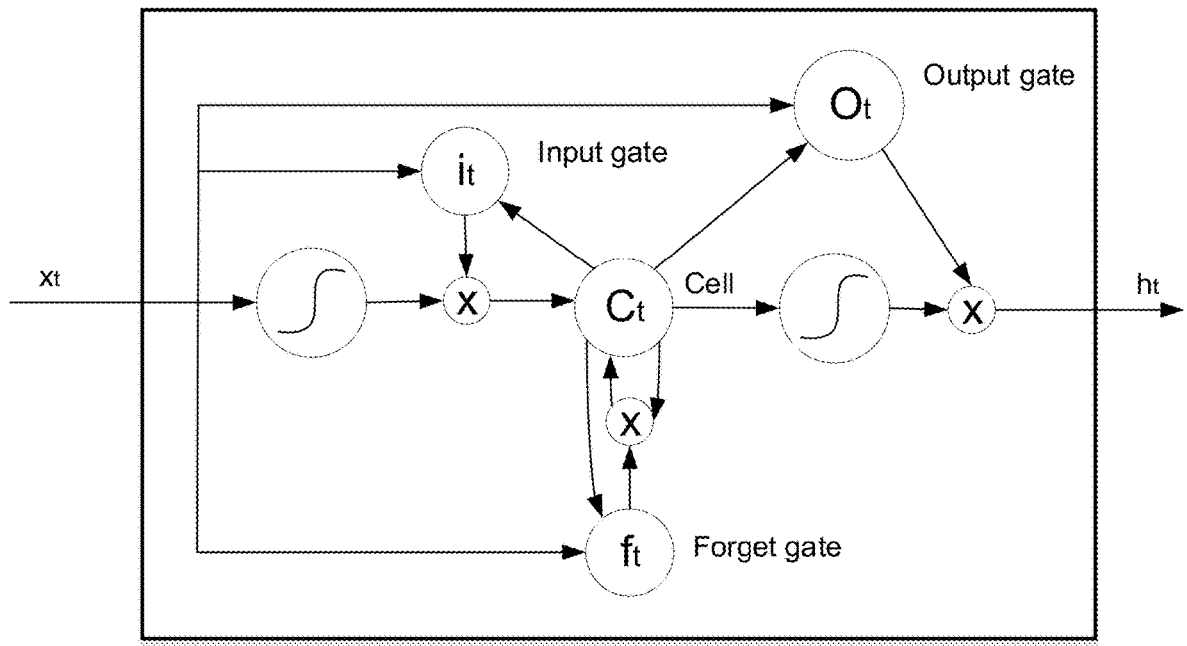
FIG. 3A illustrates an exemplary Long Short-Term Memory (LSTM) model for point-to-point traffic prediction, in accordance with various embodiments.
Figure 3B:
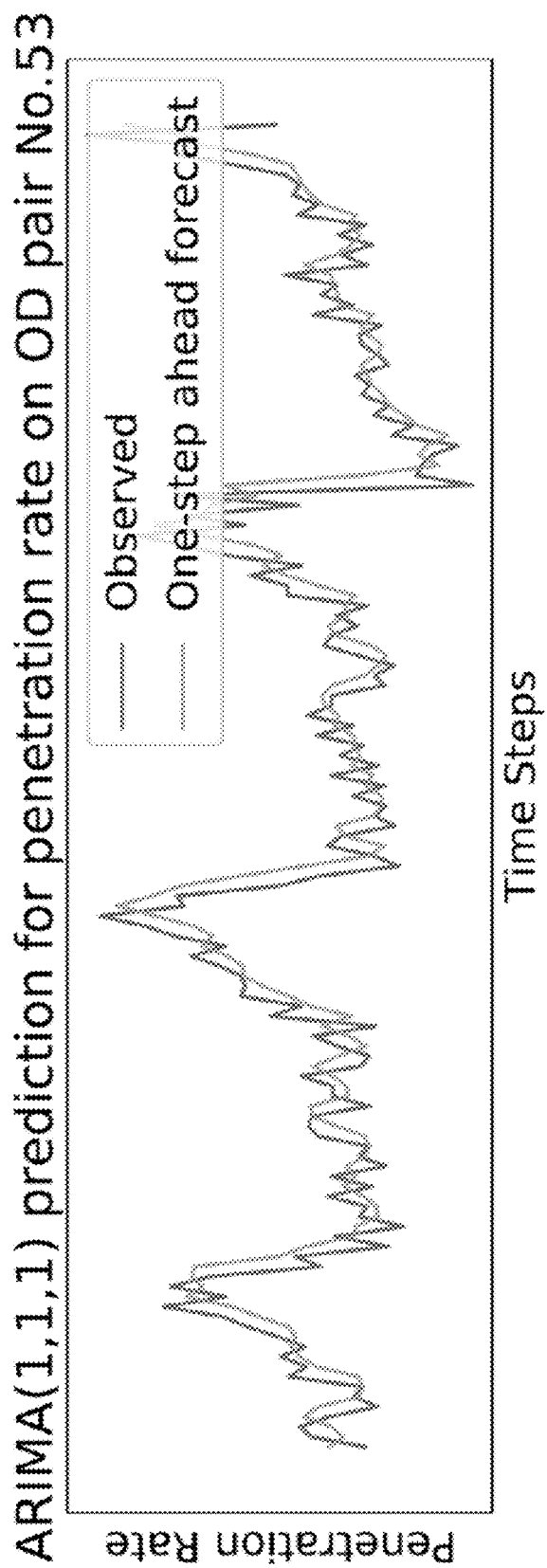
FIG. 3B illustrates an exemplary comparison of a one-step ahead prediction from ARIMA model and ground truth observation, in accordance with various embodiments.

FIG. 3B illustrates an exemplary comparison of a one-step ahead prediction from ARIMA model and ground truth observation, in accordance with various embodiments. The predictions of penetration rate over all OD pairs obtain a median mean absolute percentage error (MAPE) of 20.3% in main hour and 19.2% in peak hour and obtain a median mean absolute error (MAE) of 0.002 in both main hour and peak hour. Since the Kalman Filter model requires historical observation Y (AVI data) as input for generating sequential predictions, deploying such conventional Kalman Filter model to real world becomes impractical due to the limited availability of AVI data sources which has caused a lack of real-time well-covered ground truth OD data. Nevertheless, the Kalman Filter model can establish a baseline for comparison with other models (e.g., supervised neural network model, semi-supervised neural network model) that do not require real time feedback of Y (AVI data).

In some embodiments, for the supervised neural network model, OD flow counts between bayonets (traffic nodes with cameras) may be determined based on the AVI data, such as plate and car information specific to time intervals (e.g., half hour intervals). These AVI data OD counts can be expressed as a vector $b_t = (b_t^{OD_1}, \ldots, b_t^{OD_n})^T$, with t being the time index, and $\{OD_1, \ldots, OD_n\}$ being the set of considered ODs. Similarly, the OD counts of the vehicle platform drivers (e.g., drivers who use a mobile phone APP such as the vehicle platform APP) between the bayonets may be extracted as the trajectory data. The trajectory data ODs may be expressed as a vector with the same dimension as $b_t$ and denoted as $d_t$. A time window of ω sequence of $d_t$ may be used to predict the next time interval actual OD flow count by learning an LSTM based neural network h(•). That is, h(•) may be learned such that:

$$h(d_{t-\omega+1}, \ldots, d_t) = b_{t+1}$$

Thus, if the AVI data is accumulated in t=1, ..., T, the weights of the neural network may be obtained by minimizing:

$$L(w) = \sum_{i=1}^{T} \pounds(h(d_{i-\omega}, \ldots, d_{i-1}; w), b_i)$$

where w is the weights of the neural network h, ω is the time window, and £ (•, •) is the loss function, such as mean square error (MSE) function. The captured AVI data may possess some periodic patterns over days, for example, morning/afternoon peak during rush hours.

Figure 3C:
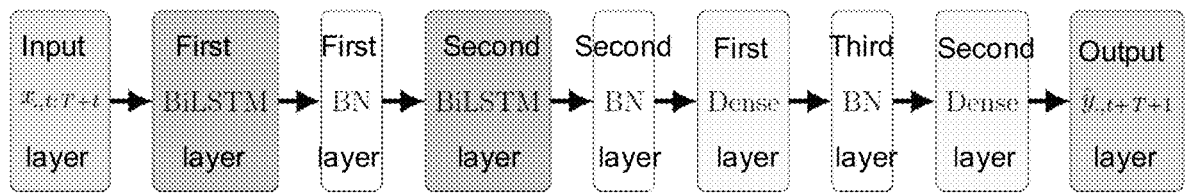
FIG. 3C illustrates a Recurrent Neural Network (RNN) architecture for supervised learning (SL) of for point-to-point traffic prediction, in accordance with various embodiments.

In some embodiments, as shown in FIG. 3C, a supervised neural network model may comprise an input layer, a first BiLSTM layer, a first BN layer, a second BiLSTM layer, a second BN layer, a first dense layer, a third BN layer, a second dense layer, and an output layer connected in a series. The input layer may pass X (trajectory data) down the series of layers. That is, the supervised neural network (e.g., RNN) model may comprise two layers of bidirectional LSTM and two layers of fully connected dense neural networks. Bidirectional LSTM duplicates a normal LSTM into two side-by-side, and in the first LSTM, input data are fed in forwardly, but in the second LSTM, input data are fed in backwardly as if time was reversed. This structure brings RNN ability to learn from the "past" and the "future." The first layer LSTM has 64 units, and the second layer LSTM has 128 units. LSTM output sequences are flattened before being sent to the fully connected dense layers. The first dense layer has 64 units and the second dense layer has 110 units. The final output 110-dimension vector is the prediction for the 110 ODs for the next time interval. The fully connected layers use scaled exponential linear unit as their activation function. Batch normalization layers are added to each layer except for the final output layer.

Deep Neural Networks (DNNs) are a family of powerful machine learning models that can achieve high performances on difficult problems such as speech recognition, visual recognition, translation, and transportation prediction. Recurrent neural networks (RNNs) are artificial networks with loops (recurrences) that recursively combine the input vectors with the network state vectors to produce a new state vector, thus allowing temporal information to persist in the learning process. In particular, LSTM is a special kind of RNN frequently used in data with long term temporal dependencies or dynamics. FIG. 3A shows an exemplary LSTM network structure. While a vanilla RNN may have difficulties in "memorizing" long-range dependencies due to the vanishing gradient, LSTM units are designed to avoid or alleviate this problem by employing cells that preserve information and use "gates" to control the information flow (how to "remember" and "forget" the information).

In some embodiments, for the supervised neural network model, an objective function with mean square error can be constructed. For model training, the objective function can be minimized to obtain optimal weights ω for the prediction function. The RNN architecture for supervised learning is shown in FIG. 3C, and the objective function may be as follows:

$$L_{sl}(\omega) = \frac{1}{|N||M|} \sum_{i \in N} \sum_{t \in M} \|h(x_{t-T+1}, \ldots, x_t; \omega) - y_{i,t+T+1}\|^2$$

Thus, by minimizing the loss function $L_{sl}$, trained weights for the prediction function and a trained point-to-point traffic prediction model for supervised learning can be obtained.

As shown, for the supervised RNN model, X (trajectory data) is passed through a first BiLSTM layer, a first BN layer, a second BiLSTM layer, a second BN layer, a first dense layer, a third BN layer, and a second dense layer to obtain a predicted total traffic volume ŷ, which is compared with the ground truth y obtained from Y (AVI data, such as real traffic volume monitored by physical devices like installed detectors, etc.) in the objective function. By minimizing the objective function, the weights of the RNN model can be optimized for accurate prediction of traffic volume.

The supervised RNN model may be useful for predicting traffic volume between points that the AVI is available for verification. However, AVI data is limited by the availability of installed monitoring devices. For example, cross-roads that have not installed monitoring devices lack AVI data, and the RNN model may not be applicable to such locations because the ground truth data is unavailable. Thus, the supervised model may be disadvantaged in deployment because the supervised model requires ground truth OD flow training data (e.g., AVI data) for each OD pair for traffic prediction. To overcome the unavailability of sufficient training data and predict for the OD pairs without supervision, a semi-supervised learning (SSL) model (e.g., SSL RNN model) is disclosed. For such unsupervised pairs, the trajectory data may be relied on to make a prediction for OD flow. By semi-supervised learning, traffic flow between OD points (or any point pairs) can be predicted without any supervised data for the OD points.

Figure 3D:
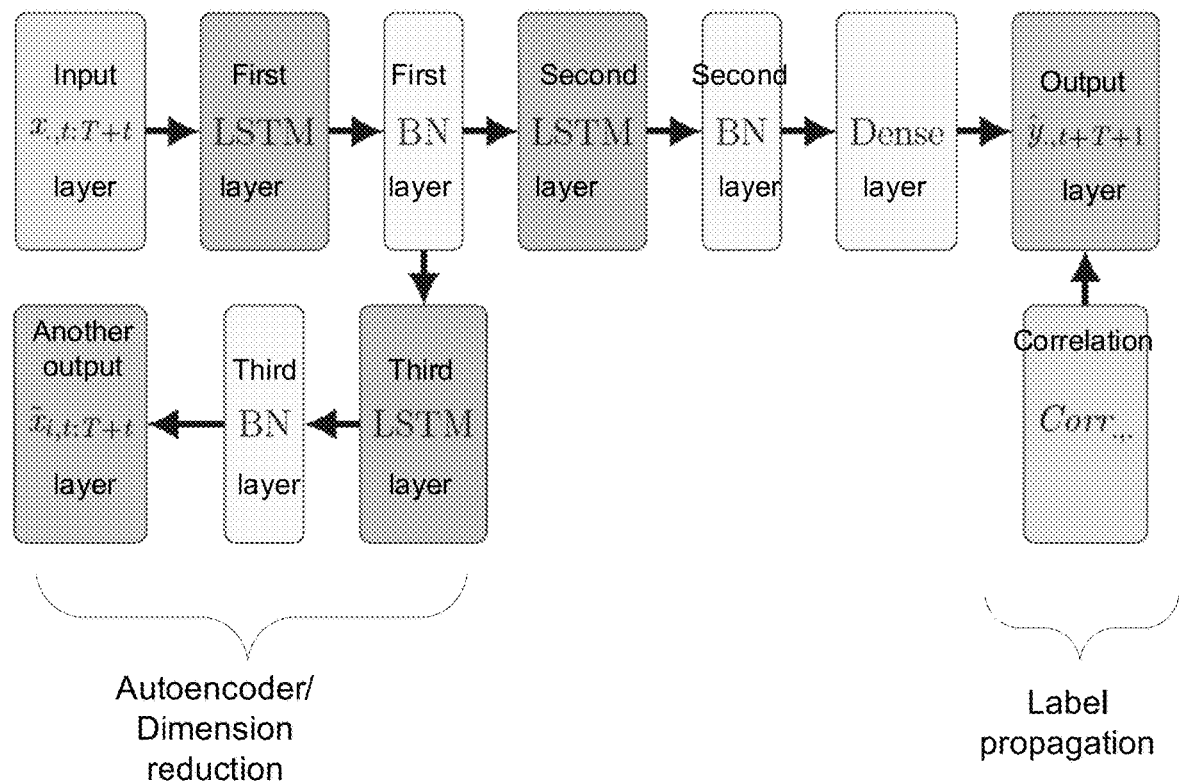
FIG. 3D illustrates a Recurrent Neural Network (RNN) architecture for semi-supervised learning (SSL) of point-to-point traffic prediction, in accordance with various embodiments.

In some embodiments, autoencoder and label propagation may be introduced to the supervised neural network model to form the semi-supervised learning framework as shown in FIG. 3D. Autoencoder is a type of artificial neural network used to learn efficient data coding in an unsupervised manner. The goal of an autoencoder is to learn a representation (encoding) for a set of data, typically for the purpose of dimensionality reduction. Label Propagation is a semi-supervised machine learning algorithm that assigns labels to previously unlabeled data points. At the start of the algorithm, a (generally small) subset of the data points have labels (or classifications). These labels are propagated to the unlabeled points throughout the course of the algorithm. Within real world traffic networks, the networks tend to have community structure.

In some embodiments, the semi-supervised learning framework includes a dimension reduction module and a label propagation module. As shown in FIG. 3D illustrating an exemplary semi-supervised learning model, X (trajectory data) is passed through a first LSTM layer, a first BN layer, a second LSTM layer, a second BN layer, and a dense layer to obtain a predicted total traffic volume ŷ. For the dimension reduction module (autoencoder), the first BN layer's output may pass to a third LSTM layer and a third BN layer to obtain x̃ (projected trajectory data). As shown in FIG. 3D, the series from the input layer to the another output layer may be referred to as an autoencoder. The autoencoder models compression and subsequent decompression of X. Making the model to learn how to compress and decompress X helps the model make a better prediction for Y (traffic volume). The corresponding loss term for the autoencoder is as follows ("ae" means auto-encoder):

$$L_{ae} = \frac{1}{|N||M|} \sum_{i \in N} \sum_{t \in M} \|\tilde{x}_{i,t:t+T} - x_{i,t:t+T}\|^2$$

The dimension reduction module may allow using a much smaller model (e.g., in terms of number of parameters in the model) to achieve a similar performance as using the original trajectory data. That is, with the autoencoder, trajectory data X may be projected into lower dimension without losing much information, while achieving the same level of prediction accuracy. For example, the number of parameters in the semi-supervised model may be only 6% of the number of parameters in the supervised model, while the two models give comparative results. For another example, the trajectory data of original 182 channels may be compressed into a 16 channel LSTM autoencoder, with the recovered values from the autoencoder being very close to the truth. There are several benefits associated with the reduction in the number of parameters. For example, less money/computation budget will be needed to get a same prediction accuracy.

For label propagation, the predicted total traffic volume ŷ may be modified by a correlation function. The label propagation loss term may be designed as follows to leverage correlation information within X to predict unsupervised OD pairs ("lp" means label propagation):

$$L_{lp} = \frac{1}{|N|^2|M|} \sum_{i \in N_u} \sum_{j \in N_s} \sum_t \text{Corrx}_{i,j} \|\hat{y}_{i,t+1} - \hat{R}_{i,j} \hat{y}_{j,t+1}\|^2$$

where $\text{Corrx}_{i,j}$ is a correlation (e.g., Kendall correlation) between $\{x_{i,\cdot}\}$ and $\{x_{j,\cdot}\}$ in training set (that is, a correlation between point pair i's trajectory data, and point pair j's trajectory data). For example, if $X_{firstODpair}$ is 5, 15, and 20 vehicles at a first hour, a second hour, and a third hour respectively, and $X_{secondODpair}$ is 9, 31, and 40 vehicles at the first hour, the second hour, and the third hour respectively, the correlation between the first and second OD pairs $\text{Corrx}_{i,j}$ may be determined to be approximately 0.9 out of 1. Accordingly, a strong correlation such as 0.9 out of 1 may indicate that the AVI data (traffic volume data) between the first and second OD pairs may have similar trends. Thus, the unknown AVI data between the second OD pair may be determined based on the correlation and the known AVI data of the first OD pair.

$\hat{R}_{i,j}$ is the estimated value of $$\frac{Y_{scale:i}}{Y_{scale:j}},$$

$N_s$ is the set of supervised OD pairs, M is the number of time windows, and $N_u$ is the set of unsupervised OD pairs. $\hat{y}_{i,t+1} - \hat{y}_{j,t+1}$ is the difference between the output layer's output for the point pair i and the output layer's output for the point pair j (see FIG. 3D for output layer).

Figure 3E:
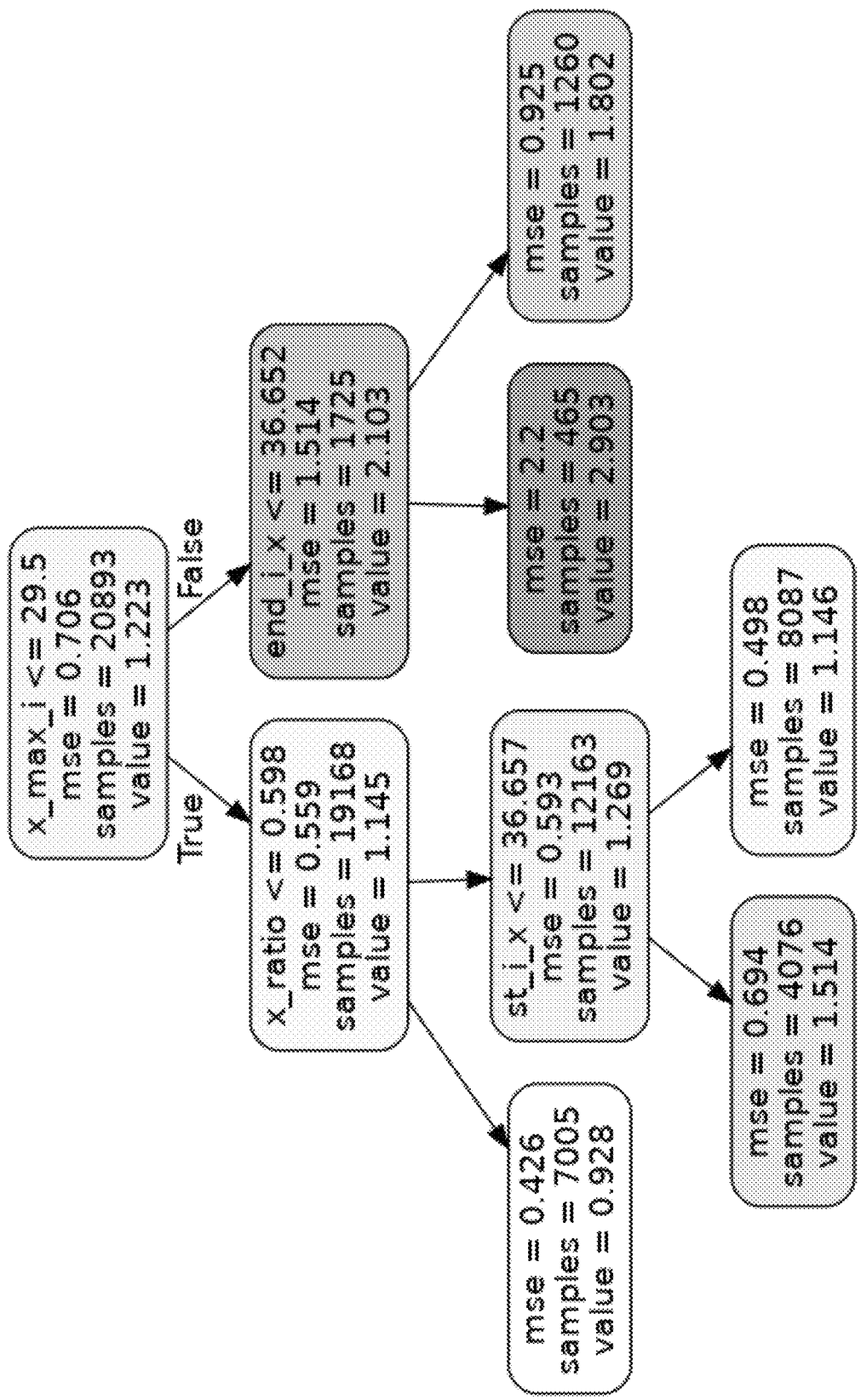
FIG. 3E illustrates an exemplary regression tree in the random forest model with five leaf nodes, in accordance with various embodiments.
Figure 3F:
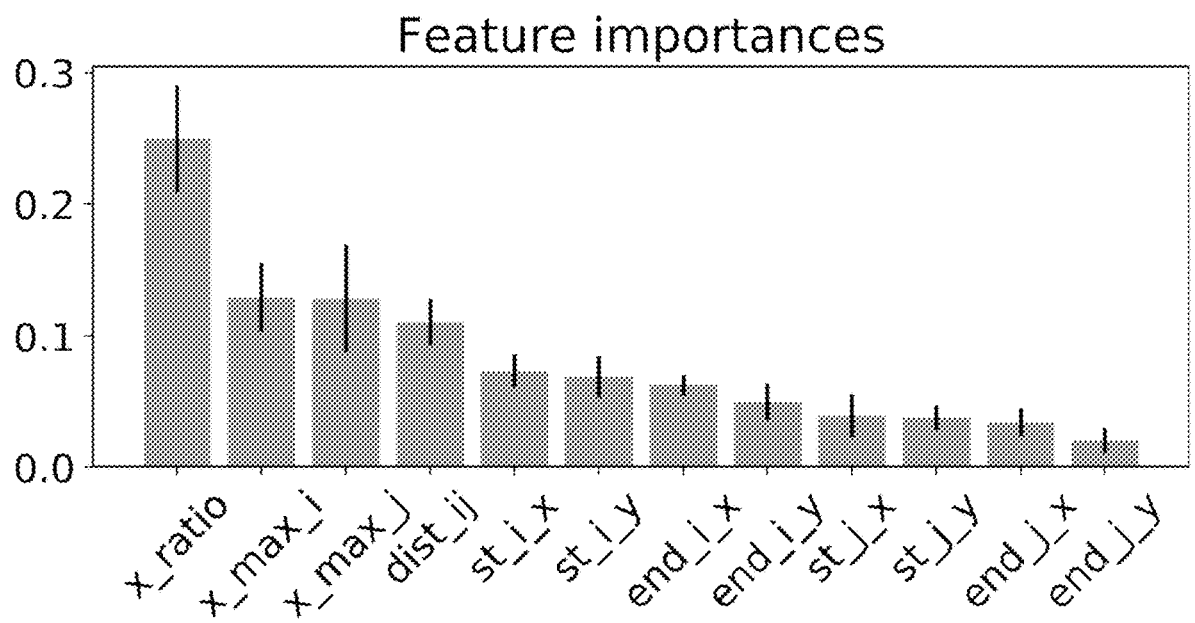
FIG. 3F illustrates an exemplary importance analysis for factors in the random forest model, in accordance with various embodiments.

In some embodiments, a random forest regression model may be used to predict $\hat{R}_{i,j}$, the ratio of the maximum volume between OD pairs i and j:

$$\hat{R}_{i,j} = f\left(x_i^{max}, x_j^{max}, dis_{i,j}, \frac{x_i^{max}}{x_j^{max}}, loc_i, loc_j\right) \approx \frac{Y_{scale:i}}{Y_{scale:j}}$$

where the function f(•) stands for a random forest regression function. Random forests can be viewed as an ensemble learning method for regression that operates by constructing a multitude of regression trees for training and outputting the mean prediction of the individual trees. $x_i^{max}$ is the maximum volume of the trajectory data for point pair i within one day, is the averaged distance between the two nodes of OD pair i and the two nodes of OD pair j, and $loc_i$ is the latitude and longitude of both nodes of pair i. For example, a toy size tree with only 5 leaf nodes is shown in FIG. 3E. This random forest model makes prediction for the maximum volume over certain OD pair based on this OD pair's geographical information and its neighboring information. In FIG. 3F, a standard factor importance analysis shows that the most important factor, x_ratio, is the ratio of the trajectory counts between pair i and j. The next two most important factors are x_max_i and x_max_j, the maximum trajectory volume on pair i and pair j, respectively. x_max_i is the maximum trajectory volume on pair i. dist_ij is the averaged distance between OD pair i and j. st_i_x and st_i_y stands for the longitude and latitude of the starting node of pair i. Similarly, end_i_x and end_i_y stands for the longitude and latitude of the destination node of pair i. This factor importance analysis shows that the random forest model is mostly based on the information from the trajectory data.

Figure 3G:
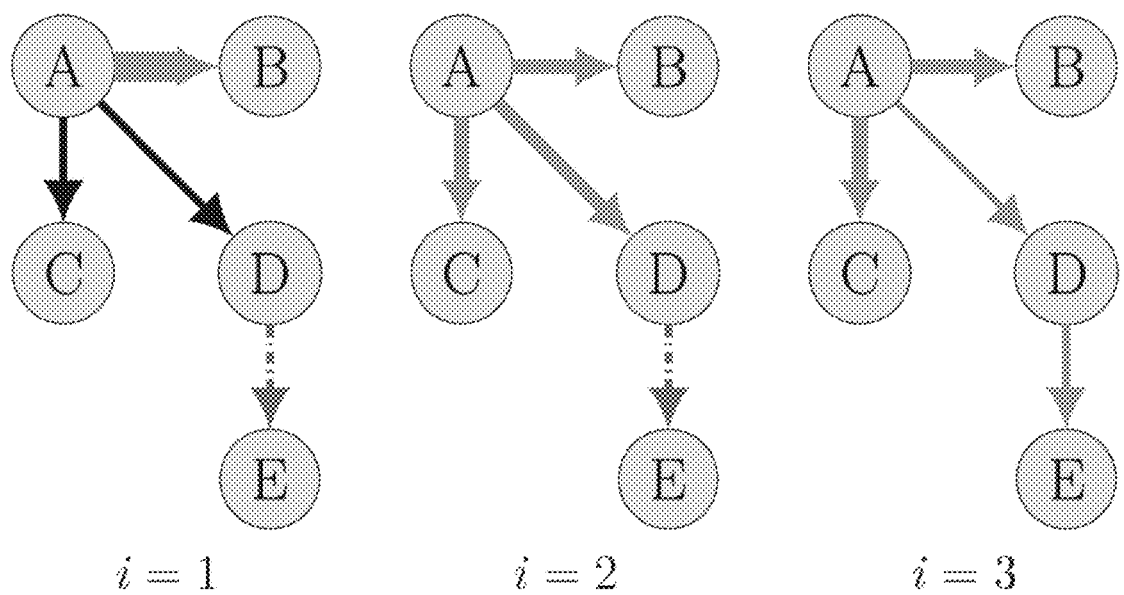
FIG. 3G illustrates an exemplary label propagation for point-to-point traffic prediction, in accordance with various embodiments.

FIG. 3G shows an example of propagating the predicted flow volume of supervised OD pair A-B to the neighboring unsupervised pair D-E after two iterations. In FIG. 3G, A-B is a pair with AVI (traffic volume) data, while A-C, A-D, and D-E are pairs with no AVI data. That is, monitoring devices are available at the OD pair A-B to capture AVI data while unavailable at locations C, D, and E. After a first label propagation, the AVI data for A-B is propagated to A-C and A-D. With the A-D traffic volume been predicted, the traffic volume through D can be used for a second label propagation. After the second label propagation, the AVI data for A-D is propagated to D-E similar to the first label propagation to determine the real traffic volume between D-E, without having to install monitoring devices at D and E. If the AVI data for j (e.g., A-B) is known (and can be used as ground truth) and AVI data for i (e.g., D-E) is unknown, the traffic volume prediction for j can be done according to the supervised RNN described above with j's AVI data being ground truth. Since j has the ground truth, the prediction should be more accurate than with no ground truth. If trajectory data $\{x_{i,.}\}$ and trajectory data $\{x_{j,.}\}$ show enough correlation (e.g., $Corrx_{i,j}$ being above a threshold), the predicted traffic volume for j can be used as the ground truth for i and help train weights for i's model.

For example, the unknown AVI data may scale with the unknown AVI data's corresponding trajectory data same as the way that the known AVI data scales with the known AVI data corresponding trajectory data. For another example, an area may comprise a number of point pairs AB, CD, EF, and GH, and traffic flows from A to B, from C to D, from E to F, and from G to H respectively. Respective trajectory data between the point pairs AB, CD, EF, and GH is known. Traffic volumes (in terms of AVI data) between the point pairs CD, EF, and GH are known, while the AVI data between the point pair AB is unknown. To obtain the unknown AVI data between AB, the trajectory data is analyzed to determine how the changes in trajectory data between CD, EF, and GH affect the trajectory data between AB. If there is a strong correlation between the trajectory data, the unknown AVI data between AB may be determined based on the known AVI data between CD, EF, and GH as discussed. With the unknown AVI data between AB determined, the future traffic flow between AB can be predicted. That is, if CD, EF, and GH are first point pairs and AB is a second point pair, the traffic volume between the second point pair may be determined based on (1) the traffic volume of one or more first point pairs and (2) a correlation between the first point pair's trajectory data and the one or more second point pairs' trajectory data.

Thus, the overall objective for the semi-supervised learning (SSL) model is to minimize a loss function:

$$L_{ssl} = \lambda_{ae} L_{ae} + \lambda_{lp} L_{lp} + L_{sl}$$

$L_{sl}$ is the loss term for the supervised learning, and a smaller value means that better weights for supervised learning have been obtained from training. $L_{ae}$ is the loss term for autoencoder, and a smaller value means that better weights for dimension reduction have been obtained from training. $L_{lp}$ is the loss term for label propagation, and a smaller value means that better weights for semi-supervised learning have been obtained. A represents a parameter. Thus, minimizing the loss function $L_{ssl}$ can obtain trained weights for the prediction function and a trained point-to-point traffic prediction model for semi-supervised learning.

In some embodiments, $\lambda_{ae} L_{ae}$ may be referred to as a first loss parameter, $\lambda_{lp} L_{lp}$ may be referred to as a second loss parameter, $L_{sl}$ may be referred to as a third loss parameter. As shown above, training the one or more weights of the neural network model comprises minimizing a total loss; the total loss comprises a first loss parameter associated with a difference between the trajectory data i and the projected trajectory data. The total loss comprises a second loss parameter associated with the correlation. The second loss parameter is further associated with a difference between a predicted traffic volume for the first point pair and a predicted traffic volume for the second point pair; and the predicted traffic volume for the second point pair is adjusted by a ratio trained by a random forest model. The total loss comprises a third loss parameter associated with a difference between a predicted traffic volume and the obtained traffic volume; and the predicted traffic volume is predicted based on the trajectory data i.

In some embodiments, the disclosed model(s) may be trained with sample traffic bayonet data and the trajectory data of APP drivers, for example, with respect to a city. The artificial neural network may be implemented using Keras, with backend on Tensorflow. Each anonymous trajectory is a sequence of a vehicle's geographic location (longitude and latitude) with timestamps. Using Haversine formula, the distance between the vehicle and a specific bayonet location can be calculated. When a vehicle's location is within the vicinity radius r of a bayonet, it is assumed to pass this bayonet at the time indicated by the corresponding timestamps. The setting of r mainly considers the errors in the location of bayonets provided to us, accumulated errors in geographic distance calculations, and actual road condition. In one example, r=50.0 m. For each OD pair, the number of continuous trajectories first passed the node O (a bayonet) may be counted, and then later arriving or passing the node D (another bayonet) within the time interval where the start time (the timestamps when the trajectory passes O, if a subsequence of consecutive points in the trajectory are within the vicinity radius of O, use the latest timestamps) lies. Each time interval $\Delta T=30$ min.

In some embodiments, a network composed of N=11 bayonets is applied to the disclosed algorithm. OD-flows are bidirectional for each pair of nodes, therefore N (N−1)=182 different ODs are considered here. Index of OD-flow is given by the standard permutation, i.e., $(i-1)\cdot(N-1)+(j-1)-1(i<j)$, where i=Index of O, j=Index of D, and I(•) is the indicator function. The dataset includes OD counts from bayonet data and trajectory data for one month. The first three quarters of the data forms the training set and the remaining forms the testing data. In one example, a time window of 24 hours may be used, in another word, w=24× 60/ΔT=48 intervals are used to make a prediction. The lookout l=1, that is, the past 48 intervals data is used to predict the next 1 interval (e.g., 30 min) OD-flows. For this reason, the input data was reshaped to a 3-mode tensor, with each slice being a 48×182 matrix. The whole neural network may be trained by minimizing the mean squared error between the prediction and the actual OD-flow count from bayonets data. The training uses batch size of 128 and trains 125 epochs, and 10% of training data is used for training validation.

Various exemplary results from running the above models are described below. In some embodiments, the random forest model has 50 trees, and each tree may have at most 25 leaf nodes. A 14-fold cross validation prediction may be used to obtain the prediction of $\hat{R}_{i,j}$. For the semi-supervised model, the autoencoder part may be pre-trained with $L_{ae}$ and then the weights in the autoencoder part can be frozen. The autoencoder term in the objective function may be omitted for semi-supervised model. The weight for label propagation loss may be $\lambda_{lp}=0.1$.

In some embodiments with respect to the 182 ODs, for the time range when most travel activities happen (from 6 am to 10 pm referred to as main hours), the median MAE and MAPE for the supervised model are 71.8 and 24.0% respectively. For the morning and afternoon peak hours (6:30 am to 9:30 am and 4:30 pm to 7:30 pm collectively referred as peak hours), the median MAE and MAPE for the supervised model are 74.9 and 24.8%. For the semi-supervised model, the prediction performance has a relatively small change when a different number of unsupervised nodes is configured. The evaluation metrics disclosed may be solely based on OD pairs within the unsupervised node set. When three nodes are randomly picked out of all fourteen nodes as unsupervised nodes, the main hour median MAE and MAPE are 86.8 and 36.9% respectively, the peak hour median MAE and MAPE are 88.9 and 38.8% respectively. These results are shown in Table 4 and Table 5 below.

The OD counts time series value may vary from about 10 to over 1000. At the off-peak hours, as the traffic volumes are low, even a small MAE might contribute a relatively large MAPE. Yet from the traffic management perspective, these time periods are of less concern. For the best and worst 5 ODs with respect to MAE and MAPE, the performance measures are listed in Table 1, more details of which can be found in Table 2 and Table 3.

TABLE 1

Performance of best/worst 5 ODs in MAE/MAPE representation

|  | OD_ID | O_D | MAE | OD_ID | O_D | MAPE |
|---|---|---|---|---|---|---|
| Best 5 | 96 | 10-7 | 31.5 | 99 | 10-11 | 23.57% |
|  | 87 | 9-8 | 36.4 | 38 | 4-10 | 23.57% |
|  | 66 | 7-8 | 36.4 | 92 | 10-3 | 23.75% |
|  | 88 | 9-10 | 36.5 | 15 | 2-7 | 23.81% |
|  | 98 | 10-9 | 37.1 | 93 | 10-4 | 23.82% |
| Worst 5 | 53 | 6-4 | 172.8 | 86 | 9-7 | 57.74% |
|  | 34 | 4-6 | 150.4 | 26 | 3-8 | 57.34% |
|  | 1 | 1-3 | 137.6 | 107 | 11-8 | 54.63% |
|  | 42 | 5-3 | 129.4 | 53 | 6-4 | 53.83% |
|  | 4 | 1-6 | 114.0 | 85 | 9-6 | 53.73% |

TABLE 2

MAPE quantiles for different time ranges over 110 ODs

|  | 0.05 | 0.1 | 0.25 | 0.5 | 0.75 | 0.9 | 0.95 |
|---|---|---|---|---|---|---|---|
| Peak | 16.7% | 18.8% | 21.8% | 25.7% | 30.2% | 32.8% | 34.3% |
| Main | 15.7% | 18.0% | 20.8% | 24.6% | 29.4% | 31.8% | 34.0% |
| 24th | 23.9% | 25.2% | 30.6% | 37.2% | 43.4% | 47.6% | 53.0% |

TABLE 3

Best/worst 5 ODs in MAPE, main hours and peak hours representation

|  | Peak hours | | | Main hours | | |
|---|---|---|---|---|---|---|
|  | OD_ID | O_D | MAPE | OD_ID | O_D | MAPE |
| Best 5 | 20 | 3-1 | 12.9% | 20 | 3-1 | 11.03% |
|  | 28 | 3-10 | 13.43% | 28 | 3-10 | 12.87% |
|  | 29 | 3-11 | 13.71% | 21 | 3-2 | 13.57% |
|  | 21 | 3-2 | 14.50% | 29 | 3-11 | 13.74% |
|  | 27 | 3-9 | 15.16% | 27 | 3-9 | 14.83% |
| Worst 5 | 76 | 8-7 | 38.98% | 107 | 11-8 | 36.97% |
|  | 6 | 1-8 | 37.06% | 4 | 1-6 | 35.56% |
|  | 56 | 6-8 | 37.00% | 76 | 8-7 | 35.18% |
|  | 4 | 1-6 | 35.16% | 87 | 9-8 | 35.00% |
|  | 53 | 6-4 | 34.86% | 6 | 1-8 | 34.68% |

In the Tables 4 and 5, the prediction performances of the disclosed three model are compared: the baseline Kalman Filter model, the supervised (SL) RNN model, and the semi-supervised (SSL) RNN model. The results reported in the SSL-RNN row are obtained with pair unsupervised, hence its result is generally worse than the other two algorithms. In SSL-RNN-3, three nodes are randomly picked out of all fourteen nodes as unsupervised nodes.

TABLE 4

MAPE performance comparison between
Supervised RNN and Kalman filter

|  | Peak Hours | | | Main Hours | | |
|---|---|---|---|---|---|---|
| MAPE | 25% | 50% | 75% | 25% | 50% | 75% |
| Kalman | 22.1% | 26.1% | 31.7% | 20.1% | 26.1% | 31.7% |
| Supervised RNN | 20.7% | 24.8% | 28.3% | 19.3% | 24.0% | 28.3% |
| Semi-supervised RNN-3 | 29.1% | 23.8% | 62.8% | 29.6% | 36.9% | 51.5% |

TABLE 5

MAE performance comparison between
Supervised RNN and Kalman filter

|  | Peak Hours | | | Main Hours | | |
|---|---|---|---|---|---|---|
| MAE | 25% | 50% | 75% | 25% | 50% | 75% |
| Kalman | 59.8 | 88.5 | 114.9 | 57.8 | 81.6 | 106.7 |
| Supervised RNN | 60.1 | 74.9 | 102.9 | 58.6 | 71.8 | 100.7 |
| Semi-supervised RNN-3 | 64.0 | 88.9 | 128.1 | 61.5 | 86.8 | 130.2 |

In some embodiments with respect to model performance, the semi-supervised learning model has a robust performance, when the nodes with AVI data has limited coverage. The prediction performance of the unsupervised OD pairs and the gap between supervised and unsupervised nodes has a relatively small change when a different number of nodes are configured as the unsupervised sets in the total of 14 nodes. Thus, the semi-supervised learning model has wide real-world application scenarios, since it only needs a small portion of supervised data to have good performances.

Figure 3H:
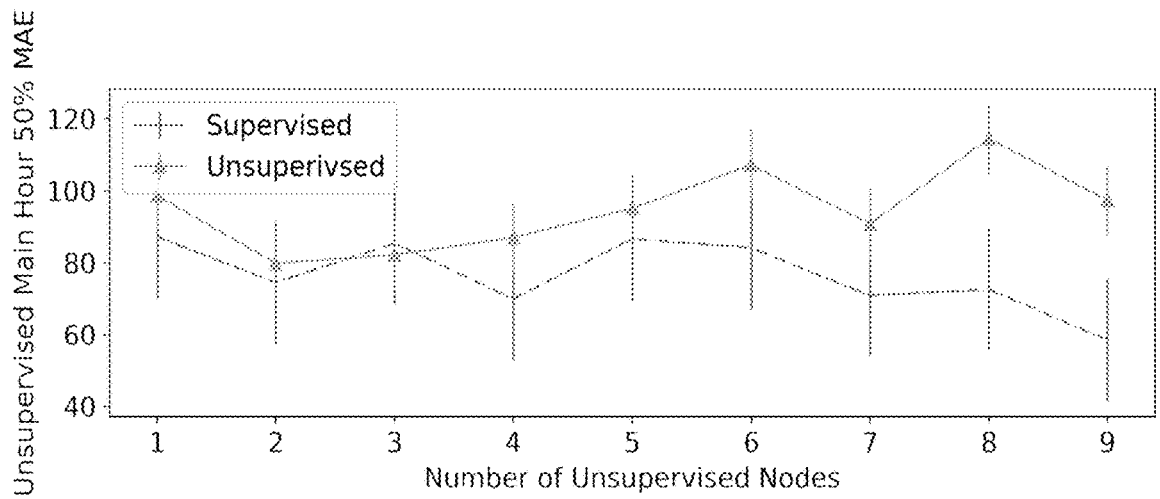
FIG. 3H and FIG. 3I illustrate exemplary changes in major matrices when the coverage of supervised nodes changes, in accordance with various embodiments.
Figure 3I:
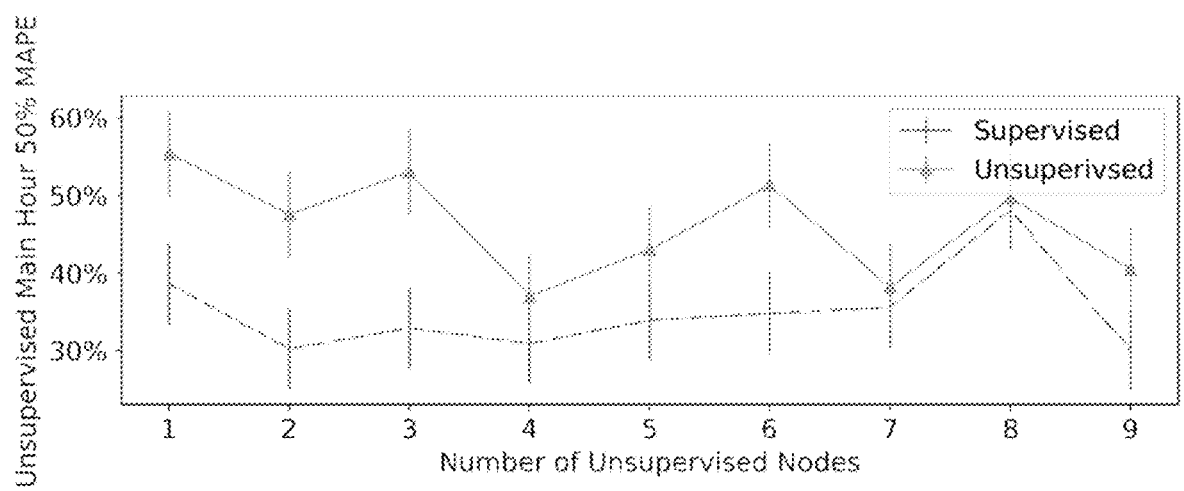

FIG. 3H and FIG. 3I show the changes in major metrics when the coverage of supervised nodes changes. FIG. 3H shows 50% MAE in Main Hour with different number of unsupervised nodes. FIG. 3I shows 50% MAPE in Main Hour with different number of unsupervised nodes.

Figure 3J:
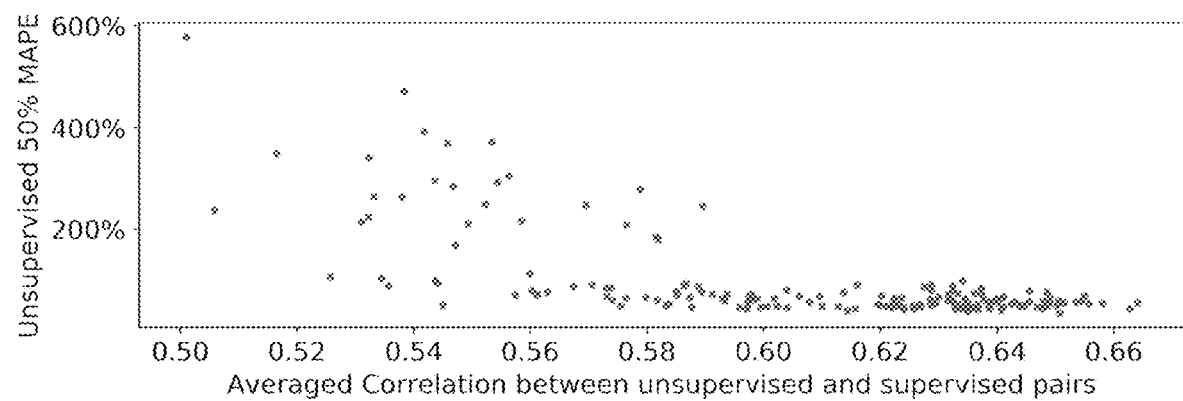
FIG. 3J illustrates an exemplary relationship between the 50% mean absolute percentage error (MAPE) of unsupervised pairs in main hour with respect to averaged correlations between unsupervised and supervised pairs, in accordance with various embodiments.

In some embodiments, for each unsupervised pair, its correlations with all other supervised pairs are computed and averaged. A larger averaged correlation may lead to better performance for the prediction over this unsupervised pair. FIG. 3J shows the relationship between the 50% MAPE of unsupervised pairs in main hour against such averaged correlations between unsupervised and supervised pairs.

Figure 3K:
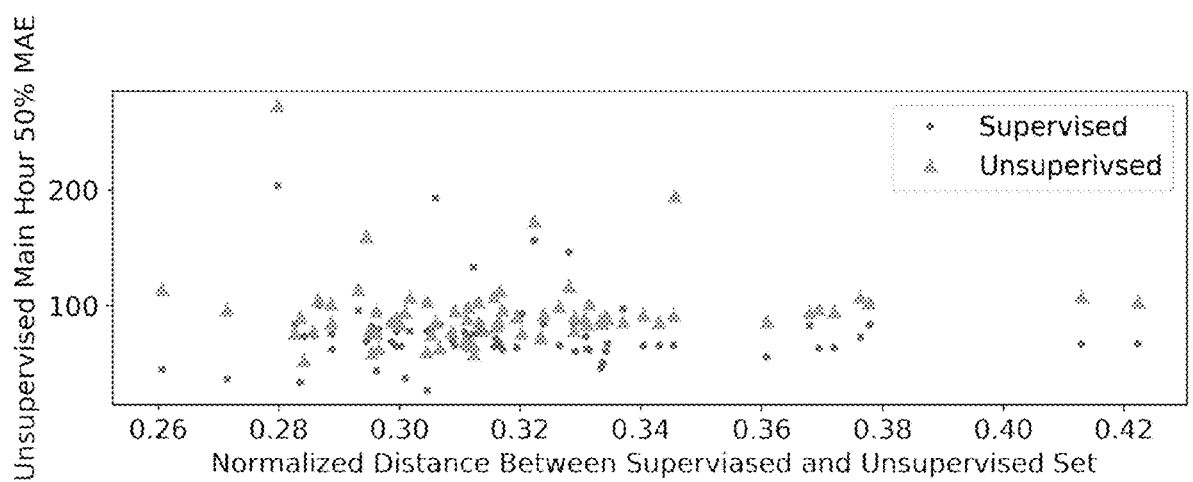
FIG. 3K illustrates an exemplary relationship between the 50% MAPE of unsupervised pairs in main hour against averaged correlations between unsupervised and supervised pairs, in accordance with various embodiments.

In some embodiments, with respect to average distance between supervised set and unsupervised set, the prediction result for unsupervised pairs is not affected by the average distance between supervised set and unsupervised set. To obtain such averaged distance for an unsupervised pair, the distance between each node of unsupervised pair to all other supervised nodes is computed and averaged. FIG. 3K shows that the comparison of main hour 50% MAE for supervised sets and unsupervised sets with different values of average distance between supervised and unsupervised nodes. Thus, the model performance has shown that the semi-supervised learning model is very robust.

In some embodiments with respect to the connection to the supervised group, the unsupervised nodes close to the supervised groups has no advantage over the nodes further from the supervised groups. Table 6 shows that the prediction for "island" OD pairs is no better than "cut" OD pairs. In these cases, two to three nodes are randomly picked as unsupervised sets. The rest of nodes are supervised nodes and only the internal OD pairs between supervised nodes are trained in the supervised setting. The cut pairs are the pairs whose one node is in supervised node set and the other node is in the unsupervised node set. The island pairs are the internal pairs of unsupervised nodes. The island pairs are further than the cut pairs to the supervised nodes in terms of topological distance.

TABLE 6

Prediction for "island" OD pairs and "cut" OD pairs.

|  | Main Hours MAPE | | | Main Hours MAE | | |
|---|---|---|---|---|---|---|
| OD pairs | 25% | 50% | 75% | 25% | 50% | 75% |
| Cut pairs | 32.4% | 52.9% | 76.0% | 61.2% | 82.1% | 118.9% |
| Island Pairs | 31.7% | 50.2% | 77.4% | 61.7% | 80.9% | 113.7% |

As shown, an RNN based artificial neural network (LSTM) may be used to model the evolution pattern of 182 OD counts time series, as well as the mapping from trajectory inferred OD counts (partial) to bayonets inferred OD counts (overall), on a real and complex road network, and make semi-supervise real-time predictions for these 182 ODs all at once. In supervise setting, the model reaches median MAPE (over all 182 ODs) around 25% for main hours (6 am to 10 pm) and peak hours (6:30 am to 9:30 am, 4:30 pm to 7:30 pm), and as low as 11% MAPE for main hours/13% MAPE for peak hours for some ODs. For unsupervised OD pairs, the model obtains median MAPE of around 38% for main and peak hours. Overall, the disclosed recurrent neural network provides accurate OD flow predictions in both semi-supervised setting and supervised setting. Based on the prediction results, various applications can be achieved. For example, the traffic signal can be controlled to accommodate a predicted larger traffic flow by staying in green longer.

Figure 4A:
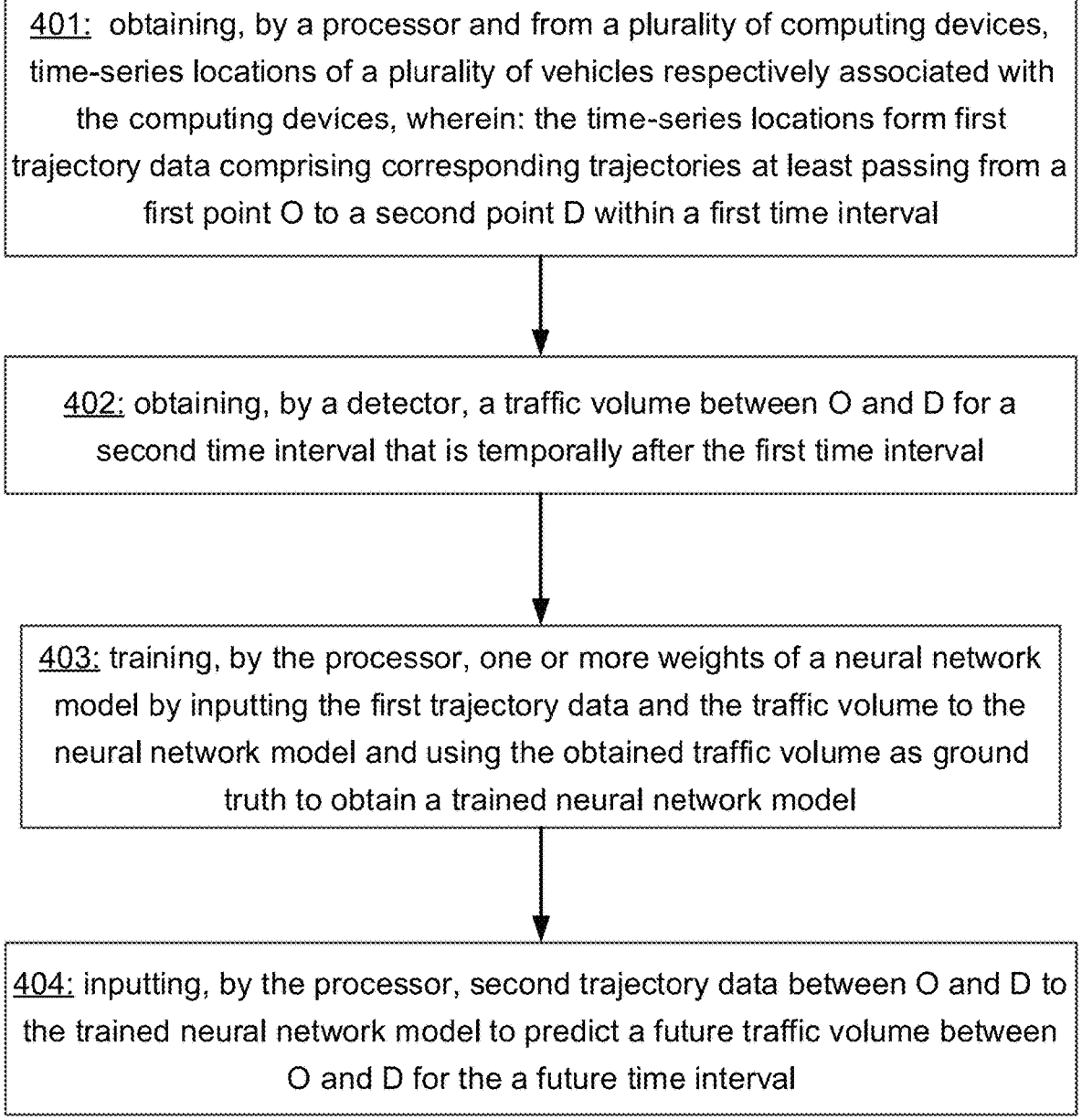
FIG. 4A illustrates a flowchart of an exemplary method for point-to-point traffic prediction, in accordance with various embodiments.

FIG. 4A illustrates a flowchart of an exemplary method 400, according to various embodiments of the present disclosure. The method 400 may be implemented, for example, by one or more components of the system 100 of FIG. 1. The exemplary method 400 may be implemented by multiple systems similar to the system 100. The operations of method 400 presented below are intended to be illustrative. Depending on the implementation, the exemplary method 400 may include additional, fewer, or alternative steps performed in various orders or in parallel.

Block 401 comprises obtaining, by a processor (e.g., the processor 104) and from a plurality of computing devices (e.g., the computing devices 110, 111), time-series locations of a plurality of vehicles respectively associated with the computing devices, wherein: the time-series locations form first trajectory data comprising corresponding trajectories at least passing from a first point O to a second point D within a first time interval. Block 402 comprises obtaining, by a detector (e.g., the detector 105), a traffic volume between O and D for a second time interval that is temporally after the first time interval. Block 403 comprises training, by the processor, one or more weights of a neural network model by inputting the first trajectory data and the traffic volume to the neural network model and using the obtained traffic volume as ground truth to obtain a trained neural network model. Block 404 comprises inputting, by the processor, second trajectory data between O and D to the trained neural network model to predict a future traffic volume between O and D for the a future time interval.

In some embodiments, the traffic volume comprises a number of vehicles that travel from O to D for the second time interval. Obtaining the traffic volume comprises: capturing first images of vehicle plates of a first number of all vehicles passing through O within the second time interval, and capturing second images of vehicle plates of a second number of all vehicles passing through D within the second time interval t; and determining a number of vehicles with vehicle plates detected from the first images and subsequently from the second images as the number of vehicles. That is, since vehicles can be identified according to images of their plates (e.g., by an image recognition algorithm), vehicles that passed from O to D can be determined if their plates were captured at O at an earlier time and again at D at a later time within the time interval.

In some embodiments, the method further comprises: in response to determining the predicted future traffic volume to exceed a threshold, sending a signal, by the processor, to a traffic signal controller (e.g., the traffic controller 107) to allow more traffic to pass through during the future time interval.

In some embodiments, the neural network model comprises: an input layer, a first BiLSTM (bidirectional long short-term memory) layer, a first BN (batch normalization) layer, a second BiLSTM layer, a second BN layer, a first dense layer, a third BN layer, a second dense layer, and an output layer connected in series. Further details are described above with reference to FIG. 3C.

FIG. 4B illustrates a flowchart of an exemplary method 410, according to various embodiments of the present disclosure. The method 410 may be implemented, for example, by one or more components of the system 100 of FIG. 1. The exemplary method 410 may be implemented by multiple systems similar to the system 100. The operations of method 410 presented below are intended to be illustrative. Depending on the implementation, the exemplary method 410 may include additional, fewer, or alternative steps performed in various orders or in parallel.

Block 411 comprises obtaining, by a processor (e.g., the processor 104) and from a plurality of computing devices (e.g., the computing devices 110, 111), time-series locations of a plurality of vehicles respectively associated with the computing devices. The time-series locations form at least (1) trajectory data i comprising corresponding trajectories at least passing through a first point pair within a first time interval and (2) trajectory data j comprising corresponding trajectories at least passing through a second point pair within the first time interval. The first point pair and the second point pair each comprise a point O and a point D, traffic flowing from the point O to the point D. The first point pair and the second point pair have at least one of: different O points or different D points. Block 412 comprises obtaining, by a detector (e.g., the detector 105), a traffic volume between the first point pair for a second time interval that is temporally after the first time interval. Block 413 comprises training, by the processor, one or more weights of a neural network model by inputting the trajectory data i, the trajectory data j, and the traffic volume to the neural network model to obtain a trained neural network model, wherein the neural network model comprises a correlation between the trajectory data i and the trajectory data j. Block 414 comprises inputting, by the processor, trajectory data k between the second point pair to the trained neural network model to predict a future traffic volume through the second point pair for a future time interval.

In some embodiments, the traffic volume comprises a number of vehicles that travel through the first point pair for the second time interval. Obtaining the traffic volume comprises: capturing first images of vehicle plates of a first number of all vehicles passing through the O point of the first point pair within the second time interval, and capturing second images of vehicle plates of a second number of all vehicles passing through the D point of the first point pair within the second time interval; and determining a number of vehicles with vehicle plates detected from the first images and subsequently from the second images as the number of vehicles. That is, since vehicles can be identified according to images of their plates (e.g., by an image recognition algorithm), vehicles that passed from O to D can be determined if their plates were captured at O at an earlier time and again at D at a later time within the time interval.

In some embodiments, the method further comprises: in response to determining the predicted future traffic volume to exceed a threshold, sending a signal, by the processor, to a traffic signal controller (e.g., the traffic controller 107) to allow more traffic to pass through during the future time interval.

In some embodiments, the neural network model comprises: an input layer, a first LSTM (long short-term memory) layer, a first BN (batch normalization) layer, a second LSTM layer, a second BN layer, a dense layer, and an output layer connected in series. Further details are described above with reference to FIG. 3D.

In some embodiments, the first BN layer is further outputted to a third LSTM layer; the third LSTM layer is outputted to a third BN layer; and the third BN layer is outputted to another output layer for obtaining projected trajectory data. Further details are described above with reference to FIG. 3D.

In some embodiments, training the one or more weights of the neural network model comprises minimizing a total loss; the total loss comprises a first loss parameter associated with a difference between the trajectory data i and the projected trajectory data. The total loss comprises a second loss parameter associated with the correlation. The second loss parameter is further associated with a difference between a predicted traffic volume for the first point pair and a predicted traffic volume for the second point pair; and the predicted traffic volume for the second point pair is adjusted by a ratio trained by a random forest model. The total loss comprises a third loss parameter associated with a difference between a predicted traffic volume and the obtained traffic volume; and the predicted traffic volume is predicted based on the trajectory data i.

The techniques described herein are implemented by one or more special-purpose computing devices. The special-purpose computing devices may be desktop computer systems, server computer systems, portable computer systems, handheld devices, networking devices or any other device or combination of devices that incorporate hard-wired and/or program logic to implement the techniques. Computing device(s) are generally controlled and coordinated by operating system software. Conventional operating systems control and schedule computer processes for execution, perform memory management, provide file system, networking, I/O services, and provide a user interface functionality, such as a graphical user interface ("GUI"), among other things.

Figure 5:
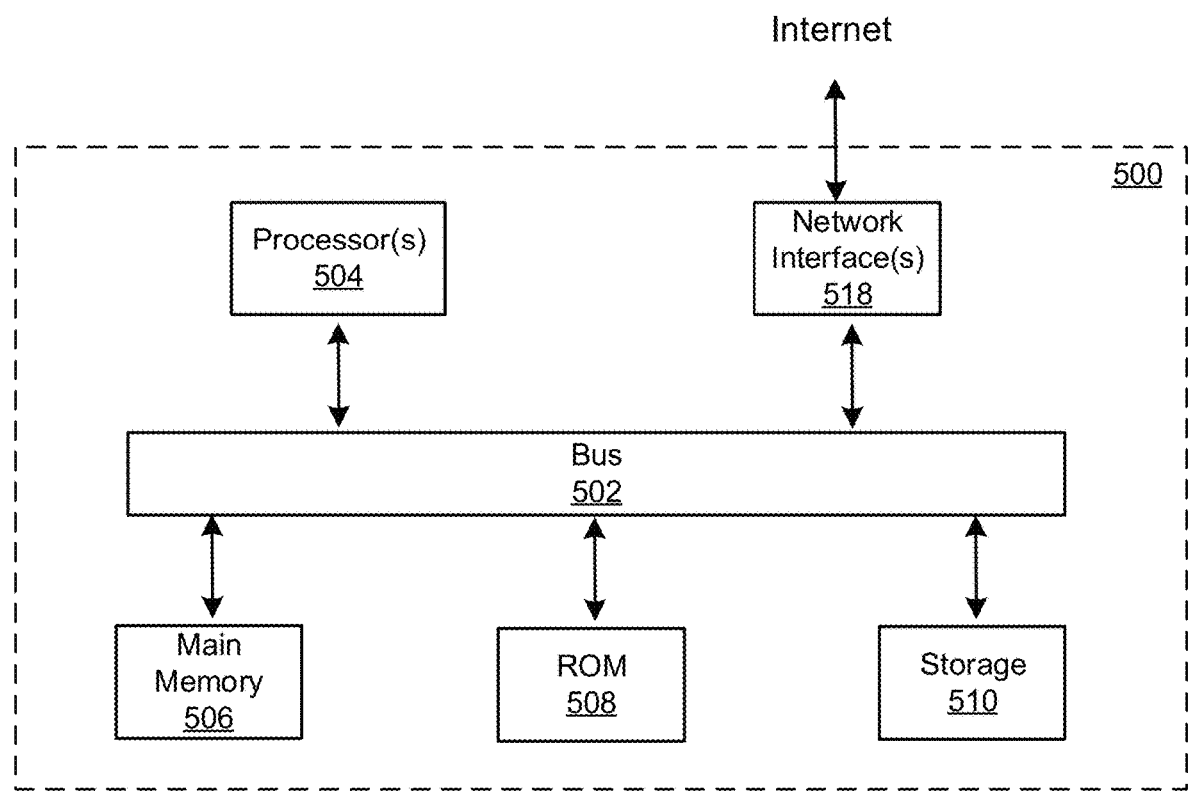
FIG. 5 illustrates a block diagram of an exemplary computer system in which any of the embodiments described herein may be implemented.

FIG. 5 is a block diagram that illustrates a computer system 500 upon which any of the embodiments described herein may be implemented. The system 500 may correspond to the system 102 or 103 described above. The computer system 500 includes a bus 502 or other communication mechanism for communicating information, one or more hardware processor(s) 504 coupled with bus 502 for processing information. Hardware processor(s) 504 may be, for example, one or more general purpose microprocessors. The processor(s) 504 may correspond to the processor 104 described above.

The computer system 500 also includes a main memory 506, such as a random access memory (RAM), cache and/or other dynamic storage devices, coupled to bus 502 for storing information and instructions to be executed by processor(s) 504. Main memory 506 also may be used for storing temporary variables or other intermediate information during execution of instructions to be executed by processor(s) 504. Such instructions, when stored in storage media accessible to processor(s) 504, render computer system 500 into a special-purpose machine that is customized to perform the operations specified in the instructions. The computer system 500 further includes a read only memory (ROM) 508 or other static storage device coupled to bus 502 for storing static information and instructions for processor (s) 504. A storage device 510, such as a magnetic disk, optical disk, or USB thumb drive (Flash drive), etc., is provided and coupled to bus 502 for storing information and instructions. The main memory 506, the ROM 508, and/or the storage 510 may correspond to the memory 106 described above.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the operations, methods, and processes described herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor (s) 504 to perform the process steps described herein. In alternative embodiments, hard-wired circuitry may be used in place of or in combination with software instructions.

The main memory 506, the ROM 508, and/or the storage 510 may include non-transitory storage media. The term "non-transitory media," and similar terms, as used herein refers to media that store data and/or instructions that cause a machine to operate in a specific fashion, the media excludes transitory signals. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 500 also includes a network interface 518 coupled to bus 502. Network interface 518 provides a two-way data communication coupling to one or more network links that are connected to one or more local networks. For example, network interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or WAN component to communicated with a WAN). Wireless links may also be implemented. In any such implementation, network interface 518 sends and receives electrical, electromagnetic or optical signals that carry digital data streams representing various types of information.

The computer system 500 can send messages and receive data, including program code, through the network(s), network link and network interface 518. In the Internet example, a server might transmit a requested code for an application program through the Internet, the ISP, the local network and the network interface 518.

The received code may be executed by processor(s) 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The exemplary blocks or states may be performed in serial, in parallel, or in some other manner. Blocks or states may be added to or removed from the disclosed exemplary embodiments. The exemplary systems and components described herein may be configured differently than described. For example, elements may be added to, removed from, or rearranged compared to the disclosed exemplary embodiments.

The various operations of exemplary methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function, but can learn from training data to make a predictions model that performs the function.

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some exemplary embodiments, the processors or processor-implemented engines may be located in a single geographic location (e.g., within a home environment, an office environment, or a server farm). In other exemplary embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific exemplary embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the exemplary configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The invention claimed is:

1. A method for point-to-point traffic prediction, comprising:
   obtaining, by a processor and from a plurality of computing devices, time-series locations of a plurality of vehicles respectively associated with the computing devices, wherein: the time-series locations form first trajectory data comprising corresponding trajectories at least passing from a first point O to a second point D within a first time interval;
   obtaining, by a detector, a traffic volume between O and D for a second time interval that is temporally after the first time interval;
   training, by the processor, one or more weights of a neural network model by inputting the first trajectory data and the traffic volume to the neural network model and using the obtained traffic volume as ground truth to obtain a trained neural network model, wherein the training one or more weights of the neural network model further comprises minimizing a total loss, and the total loss comprises a loss parameter associated with a difference between the obtained traffic volume and a predicted traffic volume predicted based on the first trajectory data; and
   inputting, by the processor, second trajectory data between O and D to the trained neural network model to predict a future traffic volume between O and D for the a future time interval.

2. The method of claim 1, wherein:
   the traffic volume comprises a number of vehicles that travel from O to D for the second time interval; and
   obtaining the traffic volume comprises:
   capturing first images of vehicle plates of a first number of all vehicles passing through O within the second time interval, and capturing second images of vehicle plates of a second number of all vehicles passing through D within the second time interval t; and determining a number of vehicles with vehicle plates detected from the first images and subsequently from the second images as the number of vehicles.

3. The method of claim 1, further comprising:
in response to determining the predicted future traffic volume to exceed a threshold, sending a signal, by the processor, to a traffic signal controller to allow more traffic to pass through during the future time interval.

4. The method of claim 1, wherein:
the neural network model comprises: an input layer, a first BiLSTM (bidirectional long short-term memory) layer, a first BN (batch normalization) layer, a second BiLSTM layer, a second BN layer, a first dense layer, a third BN layer, a second dense layer, and an output layer connected in series.

5. A method for point-to-point traffic prediction, comprising:
obtaining, by a processor and from a plurality of computing devices, time-series locations of a plurality of vehicles respectively associated with the computing devices;
extracting, from the time-series locations, at least (1) trajectory data i comprising corresponding trajectories at least passing through a first point pair within a first time interval and (2) trajectory data j comprising corresponding trajectories at least passing through a second point pair within the first time interval, wherein:
the first point pair and the second point pair each comprise a point O and a point D, traffic flowing from the point O to the point D; and
the first point pair and the second point pair have at least one of: different O points or different D points;
obtaining, by a detector, a traffic volume between the first point pair for a second time interval that is temporally after the first time interval;
training, by the processor, one or more weights of a neural network model by inputting the trajectory data i, the trajectory data j, and the traffic volume to the neural network model to obtain a trained neural network model, wherein the neural network model comprises a correlation between the trajectory data i and the trajectory data j; and
inputting, by the processor, trajectory data k between the second point pair to the trained neural network model to predict a future traffic volume through the second point pair for the a future time interval.

6. The method of claim 5, wherein:
the traffic volume comprises a number of vehicles that travel through the first point pair for the second time interval; and
obtaining the traffic volume comprises:
capturing first images of vehicle plates of a first number of all vehicles passing through the O point of the first point pair within the second time interval, and capturing second images of vehicle plates of a second number of all vehicles passing through the D point of the first point pair within the second time interval; and
determining a number of vehicles with vehicle plates detected from the first images and subsequently from the second images as the number of vehicles.

7. The method of claim 5, further comprising:
in response to determining the predicted future traffic volume to exceed a threshold, sending a signal, by the processor, to a traffic signal controller to allow more traffic to pass through during the future time interval.

8. The method of claim 5, wherein:
the neural network model comprises: an input layer, a first LSTM (long short-term memory) layer, a first BN (batch normalization) layer, a second LSTM layer, a second BN layer, a dense layer, and an output layer connected in series.

9. The method of claim 8, wherein:
the first BN layer is further outputted to a third LSTM layer;
the third LSTM layer is outputted to a third BN layer; and
the third BN layer is outputted to another output layer for obtaining projected trajectory data.

10. The method of claim 9, wherein:
training the one or more weights of the neural network model comprises minimizing a total loss; and
the total loss comprises a first loss parameter associated with a difference between the trajectory data i and the projected trajectory data.

11. The method of claim 5, wherein:
training the one or more weights of the neural network model comprises minimizing a total loss; and
the total loss comprises a second loss parameter associated with the correlation.

12. The method of claim 11, wherein:
the second loss parameter is further associated with a difference between a predicted traffic volume for the first point pair and a predicted traffic volume for the second point pair; and
the predicted traffic volume for the second point pair is adjusted by a ratio trained by a random forest model.

13. The method of claim 5, wherein:
training the one or more weights of the neural network model comprises minimizing a total loss;
the total loss comprises a third loss parameter associated with a difference between a predicted traffic volume and the obtained traffic volume; and
the predicted traffic volume is predicted based on the trajectory data i.

14. A system for point-to-point traffic prediction, comprising:
a detector configured to obtain a traffic volume between a first point pair for a second time interval that is temporally after a first time interval; and
a processor configured to:
obtain the traffic volume from the detector, and obtain, from a plurality of computing devices, time-series locations of a plurality of vehicles respectively associated with the computing devices;
extract, from the time-series locations, at least (1) trajectory data i comprising corresponding trajectories at least passing through the first point pair within the first time interval and (2) trajectory data j comprising corresponding trajectories at least passing through a second point pair within the first time interval, wherein:
the first point pair and the second point pair each comprise a point O and a point D, traffic flowing from the point O to the point D; and
the first point pair and the second point pair have at least one of: different O points or different D points;
train one or more weights of a neural network model by inputting the trajectory data i, the trajectory data j, and the traffic volume to the neural network model to obtain a trained neural network model, wherein the neural network model comprises a correlation between the trajectory data i and the trajectory data j; and input trajectory data k between the second point pair to the trained neural network model to predict a future traffic volume through the second point pair for the a future time interval.

15. The system of claim 14, wherein:
the traffic volume comprises a number of vehicles that travel through the first point pair for the second time interval; and
to obtain the traffic volume, the processor is configured to:
  capture first images of vehicle plates of a first number of all vehicles passing through the O point of the first point pair within the second time interval, and capture second images of vehicle plates of a second number of all vehicles passing through the D point of the first point pair within the second time interval; and
  determine a number of vehicles with vehicle plates detected from the first images and subsequently from the second images as the number of vehicles.

16. The system of claim 14, wherein the processor is further configured to:
in response to determining the predicted future traffic volume to exceed a threshold, send a signal to a traffic signal controller to allow more traffic to pass through during the future time interval.

17. The system of claim 14, wherein:
the neural network model comprises: an input layer, a first LSTM (long short-term memory) layer, a first BN (batch normalization) layer, a second LSTM layer, a second BN layer, a dense layer, and an output layer connected in series;
the first BN layer is further outputted to a third LSTM layer;
the third LSTM layer is outputted to a third BN layer; and
the third BN layer is outputted to another output layer for obtaining projected trajectory data.

18. The system of claim 17, wherein:
to train the one or more weights of the neural network model, the processor is configured to minimize a total loss; and
the total loss comprises a first loss parameter associated with a difference between the trajectory data i and the projected trajectory data.

19. The system of claim 14, wherein:
to train the one or more weights of the neural network model, the processor is configured to minimize a total loss;
the total loss comprises a second loss parameter associated with the correlation and with a difference between a predicted traffic volume for the first point pair and a predicted traffic volume for the second point pair; and
the predicted traffic volume for the second point pair is adjusted by a ratio trained by a random forest model.

20. The system of claim 14, wherein:
to train the one or more weights of the neural network model, the processor is configured to minimize a total loss;
the total loss comprises a third loss parameter associated with a difference between a predicted traffic volume and the obtained traffic volume; and
the predicted traffic volume is predicted based on the trajectory data i.

* * * * *

UNITED STATES PATENT AND TRADEMARK OFFICE
CERTIFICATE OF CORRECTION

Page 1 of 2

PATENT NO. : 10,963,705 B2
APPLICATION NO. : 16/234945
DATED : March 30, 2021
INVENTOR(S) : Tao Huang et al.

It is certified that error appears in the above-identified patent and that said Letters Patent is hereby corrected as shown below:

On the Title Page

Item (57) In the Abstract:
In the last sentence, "and D for the a future time interval" should read --and D for a future time interval--.

In the Drawings

FIG. 4A, Method 404, "O and D for the a future time interval" should read --O and D for a future time interval--.

FIG. 4B, Method 414, "through the second point pair for the a future time interval" should read --through the second point pair for a future time interval--.

In the Specification

Column 1, under SUMMARY, Line 51, "future traffic volume between O and D for the a future time interval." should read --future traffic volume between O and D for a future time interval.--

Column 2, under SUMMARY, Line 32, "volume through the second point pair for the a future time interval" should read --volume through the second point pair for a future time interval--.

Column 3, under SUMMARY, Line 36, "volume through the second point pair for the a future time interval" should read --volume through the second point pair for a future time interval--.

Column 18, under DETAILED DESCRIPTION, Line 67, "and D for the a future time interval" should read --and D for a future time interval--.

Column 19, under DETAILED DESCRIPTION, Line 65, "for the a future time interval" should read --for a future time interval--.

Signed and Sealed this
First Day of June, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,963,705 B2

In the Claims

In Claim 1, Column 24, Line 57, "the a future time interval" should read --a future time interval--.

In Claim 5, Column 25, Line 46, "point pair for the a future time interval" should read --point pair for a future time interval--.

In Claim 14, Column 27, Line 3, "traffic volume through the second point pair for the a future time interval" should read --traffic volume through the second point pair for a future time interval--.